(12) United States Patent
Dixon

(10) Patent No.: US 12,097,932 B2
(45) Date of Patent: Sep. 24, 2024

(54) SYSTEM AND METHOD FOR REDUCING DRAG ON HULLS OF MARINE CRAFTS THEREBY INCREASING FLUID DYNAMIC EFFICIENCIES

(71) Applicant: John Dixon, Fort Lauderdale, FL (US)

(72) Inventor: John Dixon, Fort Lauderdale, FL (US)

(73) Assignee: Shipglide, Inc., Fort Lauderdale, FL (US)

( * ) Notice: Subject to any disclaimer, the term of this patent is extended or adjusted under 35 U.S.C. 154(b) by 0 days.

(21) Appl. No.: 18/119,324

(22) Filed: Mar. 9, 2023

(65) Prior Publication Data

US 2024/0166305 A1  May 23, 2024

Related U.S. Application Data

(60) Provisional application No. 63/427,144, filed on Nov. 22, 2022, provisional application No. 63/439,306, filed on Jan. 17, 2023.

(51) Int. Cl.
*B63B 1/38* (2006.01)
*B63B 59/04* (2006.01)

(52) U.S. Cl.
CPC ............... *B63B 1/38* (2013.01); *B63B 59/04* (2013.01); *B63B 2001/387* (2013.01)

(58) Field of Classification Search
CPC ............... B63B 1/38; B63B 2001/382; B63B 2001/385; B63B 2001/387; B63B 59/04
See application file for complete search history.

(56) References Cited

U.S. PATENT DOCUMENTS

| 5,476,056 A | * | 12/1995 | Tokunaga | E02D 31/06 |
| | | | | 137/13 |
| 6,994,045 B2 | * | 2/2006 | Paszkowski | B63B 1/38 |
| | | | | 114/67 R |
| 9,630,373 B2 | * | 4/2017 | Schimmel | F15D 1/008 |
| 2006/0251859 A1 | * | 11/2006 | D'Urso | F15D 1/005 |
| | | | | 428/156 |

(Continued)

FOREIGN PATENT DOCUMENTS

| CN | 108082388 A | * | 5/2018 | |
| CN | 113479287 A | * | 10/2021 | ........... B29C 59/022 |

(Continued)

*Primary Examiner* — Ajay Vasudeva
(74) *Attorney, Agent, or Firm* — Origins Law, LLC; Nicholas Spatola

(57) ABSTRACT

The present invention seeks to reduce the frictional resistance of a vessel through enhanced air lubrication by creating and sustaining a superaerophilic surface underneath the vessel. Air is supplied by two different means: through vents near the bow of the vessel and through the perforated superaerophilic surface underneath the vessel. The air delivered through the perforations in the superaerophilic surface prohibits wetting of microscopic structures on the surface, maintaining the superaerophilic properties of it. Since the superaerophilic surface attracts air close to the hull surface, this invention greatly increases the ratio of air from the bow vents within the boundary layer, improving the efficiency and effectiveness of the air lubrication system. Aerophilic effects are enhanced by carbon, which is captured, filtered, and mixed in with the air supplied to the plastron.

27 Claims, 13 Drawing Sheets

(56) References Cited

U.S. PATENT DOCUMENTS

| | | | | |
|---|---|---|---|---|
| 2010/0028604 | A1* | 2/2010 | Bhushan | B32B 27/08 |
| | | | | 977/890 |
| 2010/0166964 | A1* | 7/2010 | Go | F15D 1/10 |
| | | | | 264/129 |
| 2018/0362118 | A1* | 12/2018 | Barthlott | B63B 1/38 |
| 2020/0317295 | A1* | 10/2020 | O'Ceallaigh | B63B 1/36 |

FOREIGN PATENT DOCUMENTS

| | | | | |
|---|---|---|---|---|
| DE | 20114878 U1 | * | 3/2002 | ........... B29C 59/022 |
| JP | 2005048904 A | * | 2/2005 | |
| KR | 20140145290 A | * | 12/2014 | ............... B63B 1/38 |

* cited by examiner

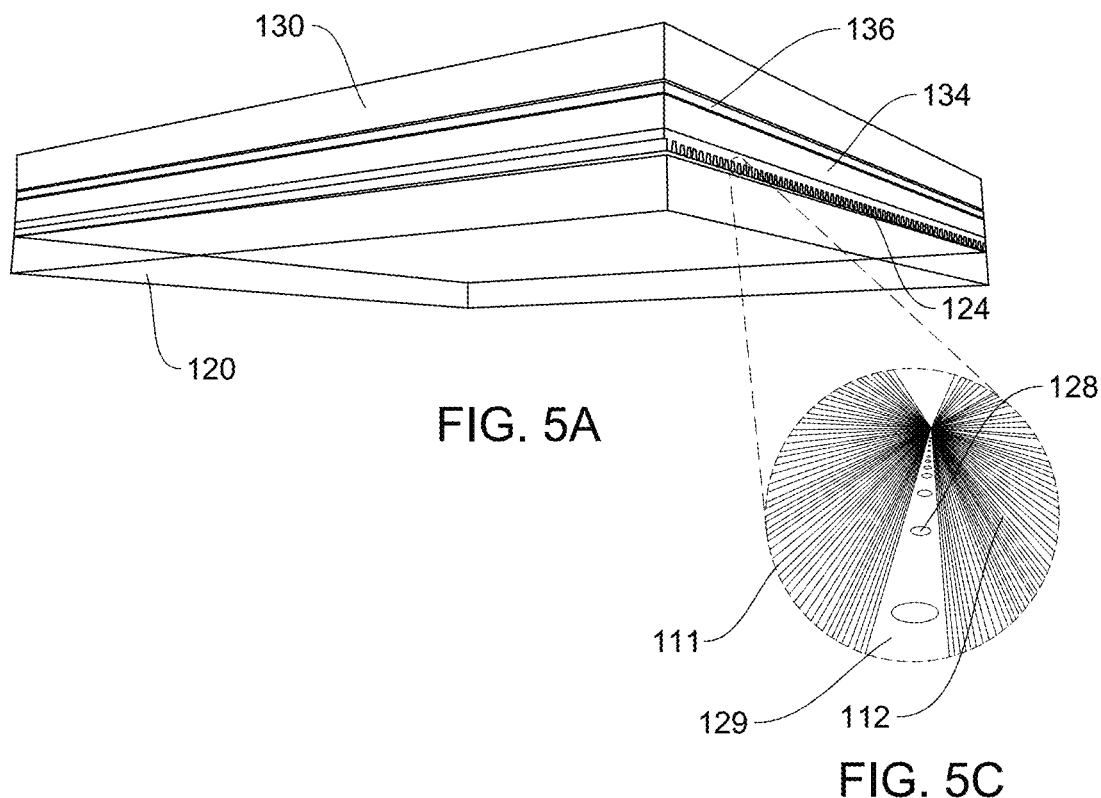
FIG. 5A
FIG. 5C
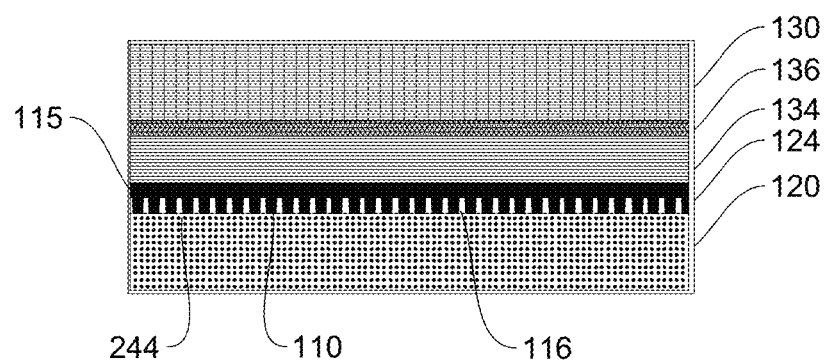
FIG. 5B

SYSTEM AND METHOD FOR REDUCING DRAG ON HULLS OF MARINE CRAFTS THEREBY INCREASING FLUID DYNAMIC EFFICIENCIES

CROSS-REFERENCE TO RELATED APPLICATIONS

This application claims priority under 35 U.S.C. § 119(e) of U.S. Provisional Patent Application Ser. No. 63/427,144, filed Nov. 22, 2022, and entitled "A System and Method for Delivering Air to a Constructed Superaerophilic Surface", and Provisional Patent Application Ser. No. 63/439,306, filed Jan. 17, 2023, entitled "A System and Method for Delivering Carbon-Rich Gas to a Constructed Superaerophilic Surface to Support an Air Lubrication System", all of which are hereby incorporated by reference.

FIELD OF THE INVENTION

The present invention relates to the creation and sustaining of a superaerophilic surface in an underwater environment that is focused on marine applications, specifically increasing the efficiency of air lubrication systems, but has other potential applications in medical and industrial fields.

BACKGROUND

A vessel's motion through water is impeded by three primary drag forces: wave-making resistance, form (pressure) resistance, and frictional drag. The use of bulbous bows and hull-form optimization often significantly reduces wave-making resistance and form drag. Frictional drag, on the other hand, has traditionally been a function mostly of wetted surface area and, to a lesser extent, hull smoothness. Despite frictional drag being responsible for upwards of 60-90% of a large vessel's total drag, until recently, relatively few innovative techniques have been employed.

Within the past few decades, one method aimed at reducing the frictional drag of a hull has been the employment of Air Lubrication Systems. Air Lubrication Systems seek to inject air bubbles into the hydrodynamic boundary layer on the underside of a vessel's hull, creating an air water mixture, to reduce the frictional drag. Air has less dynamic viscosity than water, therefore the frictional shear stresses induced on the hull by the mixture of water and air are less than the forces induced under normal operating conditions.

A problem with current Air Lubrication System technology is that the injected air bubbles tend to stray from the hull surface after injection. If the air bubbles leave the boundary layer, the drag reduction effects of air injection are lost. Current solutions to this problem include recapturing and redistributing air at more locations longitudinally along the surface of the hull, optimizing the nozzle of the air injectors, and/or increasing the pressure and volume of air delivered. Because air strays from the hull, current methods require large compressor loads to deliver enough air for any meaningful reduction in drag to be achieved. The energy required to power the compressors reduces or negates the energy savings from the drag reduction.

Thus, a need exists in the market for a system capable of reducing drag on hulls of marine crafts, while using systems that result in a net reduction in energy consumption thereby reducing greenhouse emissions from a decrease in use of fuel, a system which incorporates a replaceable surface that can temporarily adhere to a hull of a marine craft and be reapplied in regular dry dock or in-water maintenance, and can provide a system that repurposes exhaust fumes into an anti-frictional gaseous layer capable of reducing drag on a ship's hull.

SUMMARY OF THE INVENTION

The invention disclosed herein provides a system for reducing frictional drag on a hull of a marine craft. The system includes a multi-layer air lubrication system. The multi-layer air lubrication system having at least three layers, wherein at least three layers includes an outermost layer having a laser ablated superaerophilic inducing surface, a porous layer facilitating an exchange of a gaseous supply to the outermost layer, and a contact layer for bonding the multi-layer air lubrication system to a hull of a marine craft. The system also includes at least one gaseous injection point in the porous layer for receiving a gaseous supply, and an air distribution and replenishment system providing the gaseous supply to the porous layer. The air distribution and replenishment system comprising a compressor for supplying gas at a pressure marginally above the pressure exerted from water on the air plastron to ensure continued facilitation of air disbursement.

The invention disclosed herein also provides a superaerophilic inducing surface for use in reducing hydrodynamic drag on a hull of a marine craft. The surface is comprised of a metallic surface, wherein the metallic surface has a plurality of superaerophilic inducing microscopic and nanoscopic structures etched within the metallic surface from laser ablation. Each superaerophilic inducing microscopic structure of the plurality of superaerophilic inducing microscopic and nanoscopic structures defines a trench and a ridge geometry. Each superaerophilic inducing nanoscopic structure of the plurality of superaerophilic inducing microscopic and nanoscopic structures defines a trench and a ridge geometry in a sidewall of each of the superaerophilic inducing microscopic structure. The metallic surface has a plurality of apertures in at least an innermost point in the trench and ridge geometry of the superaerophilic inducing microscopic structure, wherein each aperture in the plurality of apertures is configured to pass supplied air from an interior side of the metallic structure to a wet side of the metallic structure, thereby creating an air plastron when engaged.

The invention disclosed herein also provides a method of reducing frictional drag on a marine craft hull, thereby increasing its efficiency, is discloses. The method comprising the steps of configuring a marine craft hull for reduced frictional drag by providing a superaerophilic inducing surface, wherein said superaerophilic inducing surface comprises a metallic surface having a plurality of superaerophilic inducing microscopic and nanoscopic structures etched within said metallic surface from laser ablation, wherein each superaerophilic inducing microscopic structure of said plurality of superaerophilic inducing microscopic and nanoscopic structures defines a trench and a ridge geometry and each superaerophilic inducing nanoscopic structure of said plurality of superaerophilic inducing microscopic and nanoscopic structures defines a trench and a ridge geometry in a sidewall of each of said superaerophilic inducing microscopic structure, and said metallic surface includes a plurality of apertures in at least an innermost point in said trench and ridge geometry of said superaerophilic inducing microscopic structure, wherein each aperture in said plurality of apertures is configured to pass supplied air from an interior side of said metallic structure to a wet side of said metallic structure, thereby creating an air plastron when engaged.

The invention disclosed herein also provides a system for reduction of drag on a hull of a marine craft, thereby increasing fluid dynamic efficiencies. This system includes a three-layered replenishable, composite surface, wherein the composite surface is supplied by the air lubrication system and maintains an air plastron. The three-layered replenishable, composite surface comprises a superaerophilic layer, a porous middle layer, and an assembly-to-ship Contact Layer. The superaerophilic layer is configured to obtain a micro and nano-scale topography exhibiting aerophilic and hydrophobic properties. The superaerophilic layer is configured with perforations for supplying air and maintaining an air plastron on the waterside surface. Further, the air lubrication system supplies carbon-rich air to the three-layered replenishable, composite surface passing through the porous middle layer and diffusing through the permeable superaerophilic layer thereby enhancing and maintaining the surface's air plastron and superaerophilic properties when underwater for extended periods.

It is an object of the present invention to provide a system capable of reducing drag on hulls of marine crafts.

It is yet another object of the present invention is to provide a replaceable surface that can temporarily adhere to a hull of a marine craft and be reapplied in regular dry dock or in-water maintenance.

It is a further object to provide a system that repurposes exhaust fumes into an anti-frictional gaseous layer capable of reducing drag on a ship's hull.

It is also another object of the invention to provide a system that reduces greenhouse emissions by increasing fuel efficiency of the vessel by decreasing the amount of energy needed to propel the marine craft.

The drawings and specific descriptions of the drawings, as well as any specific or alternative embodiments discussed, are intended to be read in conjunction with the entirety of this disclosure. The invention may be embodied in many different forms and should not be construed as being limited to the embodiments set forth herein; rather, these embodiments are provided by way of illustration only and so that this disclosure will be thorough, complete and fully convey understanding to those skilled in the art. The above and yet other objects and advantages of the present invention will become apparent from the hereinafter set forth Brief Description of the Drawings, Detailed Description of the Invention, and Claims appended herewith.

BRIEF DESCRIPTION OF THE DRAWINGS

FIG. 5A illustrates an enlarged, not-to-scale, isometric view of the functional surface assembly.

FIG. 5B illustrates an enlarged, not-to-scale, cross-sectional side view of the view of the functional surface assembly.

FIG. 5C illustrates an enlarged, not-to-scale, perspective view of the trench with plastron replenishment apertures of the superaerophilic surface.

DETAILED DESCRIPTION OF THE INVENTION

Figures 1A, 1B, 1C, 1D:
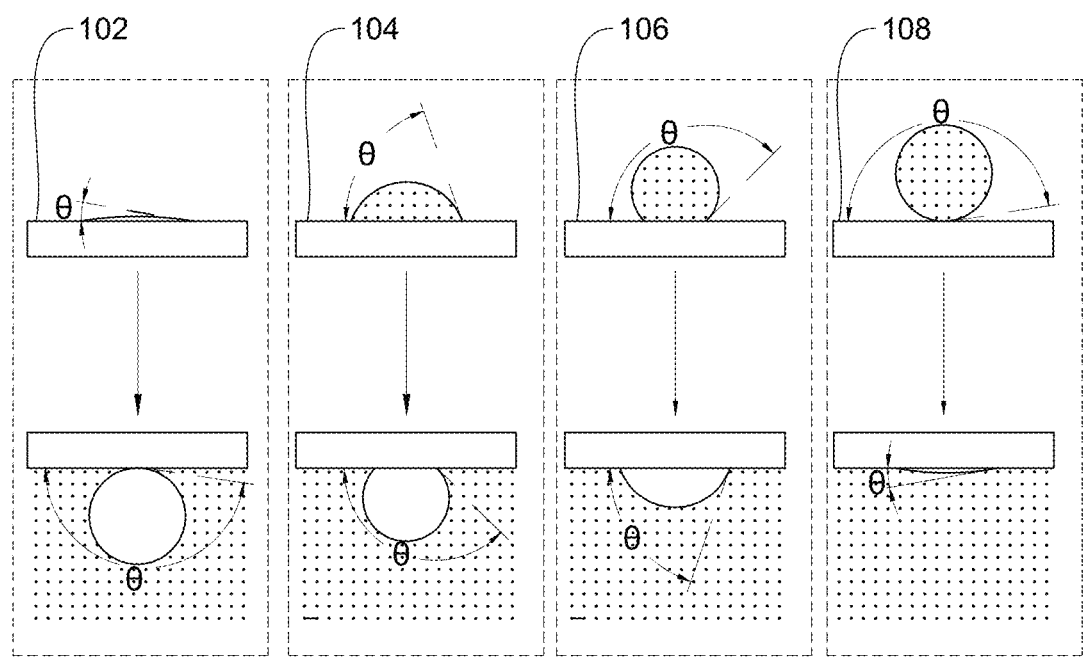
FIG. 1A illustrates a conceptual view of a surface that is superhydrophilic when in air and superaerophobic when in water.
FIG. 1B illustrates a conceptual view of a surface that is hydrophilic when in air and aerophobic when in water.
FIG. 1C illustrates a conceptual view of a surface that is hydrophobic when in air and aerophilic when in water.
FIG. 1D illustrates a conceptual view of a surface that is superhydrophobic when in air and superaerophilic when in water

The invention herein provides a solution for tightening energy and fuel efficiency requirements for the marine industry. Tightening restrictions have spurred innovations for fuel efficiency, primarily in engine refinement and hull design. However, without an efficient reduced friction coating on a hull, only so much efficiency is possible. The invention includes a uniquely configured system utilizing superaerophilic surfaces to repel water and attract air to the surface of a ship's hull, thereby reducing drag, and ensuring a continuous supply of air or carbon is provided to ensure replenishment of the air plastron, which is capable of solving the above issues, including significantly reducing drag on the hull of a ship.

As stated above, a vessel's motion through water is impeded by three primary drag forces: wave-making resistance, form (pressure) resistance, and frictional drag. The use of bulbous bows and hull-form optimization often significantly reduces wave-making resistance and form drag. Frictional drag, on the other hand, has traditionally been a function mostly of wetted surface area and, to a lesser extent, hull smoothness. Despite frictional drag being responsible for upwards of 60-90% of a large vessel's total drag, until recently, relatively few innovative techniques have been employed to combat it.

Within the past few decades, one method aimed at reducing the frictional drag of a hull has been the employment of Air Lubrication Systems. Air Lubrication Systems seek to inject air bubbles on the underside of a vessel's hull, creating an air water mixture, to reduce the frictional drag. Air has less dynamic viscosity than water, therefore the frictional shear stresses induced on the hull by the mixture of water and air are less than the forces induced under normal operating conditions.

A problem with current Air Lubrication System technology is that the injected air bubbles tend to stray from the hull surface after injection. If the air bubbles leave the boundary layer, the drag reduction effects of air injection are lost. Current solutions to this problem include recapturing and redistributing air at more locations longitudinally along the surface of the hull, optimizing the nozzle of the air injectors, and/or increasing the pressure and volume of air delivered. Because air strays from the hull, current methods require large compressor loads to deliver enough air for any meaningful reduction in drag to be achieved. The energy required to power the compressors reduces or negates the energy savings from the drag reduction.

The current invention solves these problems by implementing an engineered constructed surface with microscopic and nanoscopic structures and microscopic perforations, a Functional Surface Assembly with a porous middle layer that replenishes the air plastron, inclusion of an air distribution system (Air Plastron Replenishment System) to deliver air to and within the Porous Middle Layer, using carbon to accelerate the conversion of a laser ablated surface to having superaerophilic qualities, extracting carbon from exhaust, blackwater tanks, bioreactors, and galley fumes for carbon enhancement, implementing a device to separate particulates from gaseous carbon molecules, and incorporation of a system for enhancing air lubrication systems for ships which includes the construction of a superaerophilic surface to increase the amount of air lubrication air that is maintained in the boundary layer.

This invention minimizes the amount of energy that must be used to supply air to the underside of the hull by utilizing a three-layer "Functional Surface Assembly" with superaerophilic and superhydrophobic properties. This Functional Surface Assembly is created and installed on the outside of the hull. The surface attracts air and repels water minimizing the amount of air that must be supplied by an Air Lubrication System.

The three-layered Functional Surface Assembly includes an outermost layer may be made of a copper alloy and is called the Superaerophilic Surface. The copper alloy is turned into a superaerophilic surface by etching microscopic and nanoscopic structures on the surface. In many embodiments, an ultrafast laser is used to make the etchings, typical lasers are not equipped to carry out these etchings, but future advancements may allow more capability. Using the ultrafast laser for laser ablation can create the etchings necessary. It is to be appreciated that while laser ablation may the most efficient method of creating the etchings, other technologies, such as chemical vapor deposition, thermal spray, and other methods capable of precise etching may also be employed. The dual-scale topography allows air to permeate and attach to cavities in the surface. The trapped air is known as the air plastron, and its existence prevents the intrusion of water for short periods of time.

Over time, however, hydrostatic and hydrodynamic forces cause water to penetrate the surface and displace air, reducing the air plastron and causing a loss of superaerophilic properties. Resupplying air to the air plastron at a slow rate maintains the superaerophilicity of the surface. To do this, a layer of compressed air is created on the inside of the Superaerophilic Surface. A Porous Middle Layer is attached to the interior, non-ablated side of the Superaerophilic Surface to distribute the compressed air. A laser also drills microscopic holes in the Superaerophilic Surface, allowing for the compressed air to be delivered to the exterior surface of the Superaerophilic Surface and resupply the air plastron.

The final layer of the Functional Surface Assembly is the Contact Layer. This layer is used to adhere the entire Functional Surface Assembly to the ship's hull. The combination of the Porous Middle Layer and the Contact Layer will exhibit dielectric properties to prevent galvanic corrosion between the hull and the copper alloy.

Air will be constantly supplied to the layer of compressed air in the Porous Middle Layer to maintain the superaerophilic properties of the Functional Surface Assembly. In addition, when the ship is underway, more air will be supplied near the bow with an air lubrication system.

Surfaces like the Superaerophilic Surface described above, with structures on the microscopic and nanoscopic scale are minimally aerophilic and in some cases, even aerophobic after construction. When in contact with air, these surfaces increase their aerophilicity and hydrophobicity over time. This is caused by carbon atoms, present in the air, bonding to the surface. In air, the process of carbon attachment can take as much as two to four weeks because of the limited carbon content.

Therefore, to enhance the aerophilic and hydrophobic properties of the surface, carbon is extracted from the ship's engine exhaust, black water tanks, galley fumes, or bioreactor to be delivered to the air plastron. Carbon oxides like carbon dioxide ($CO_2$) and carbon monoxide (CO) from the exhaust, as well as hydrocarbons such as methane ($CH_4$) from black water (human waste) tanks, galley fumes, or bioreactor are filtered to extract carbon-based molecules. Without such filtering, the micro-perforated holes of the Superaerophilic Surface would quickly clog, and the invention would no longer function properly.

In addition to reducing the frictional drag of the hull, this invention prohibits the growth of marine organisms on the hull through the creation of the air plastron. Since marine organisms require water to grow, the Superaerophilic Surface's dry environment is uninhabitable to marine life.

In regards to creating and maintaining a submerged Superaerophilic Surface, this invention creates and sustains a Superaerophilic Surface in a submerged environment. The primary purpose for this invention is to increase the efficiency of Air Lubrication Systems for ship's hulls, but the surface described below has other potential applications.

An aerophilic surface attracts air or gas when submerged in a liquid, and a hydrophobic surface repels water when surrounded by air. Surfaces which are aerophilic are also hydrophobic. The more aerophilic and hydrophobic a surface is, the lower its Surface Free Energy is.

The aerophilicity of a surface submerged in water and the hydrophobicity of that same surface surrounded by air are measured by the contact angle. The concept of contact angle is shown in FIG. 1A-1D. For a hydrophobic surface with a water drop surrounded by air, a very large contact angle creates a "superhydrophobic surface". For an aerophilic surface with an air pocket submerged in water, a very small contact angle creates a "superaerophilic surface". If the contact angle of water on a surface submerged in air is greater than 150°, then it is considered superhydrophobic. If this same surface is exposed to an air bubble when submerged, the air bubble will have a contact angle of less than 5° and is considered superaerophilic.

Figure 2A:
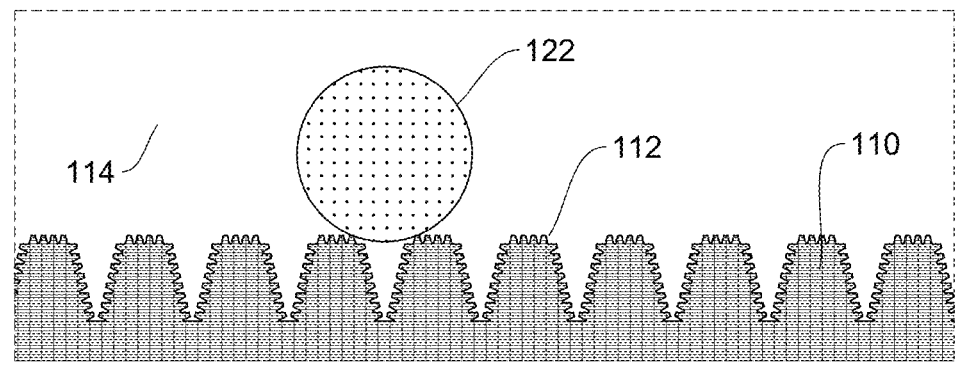
FIG. 2A illustrates an enlarged, not-to-scale, cross-sectional side view of the superaerophilic surface sitting in air.
Figure 2B:
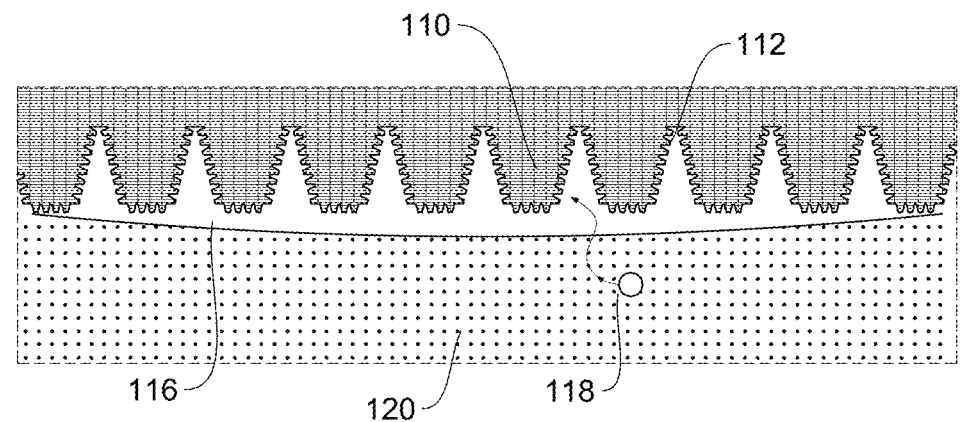
FIG. 2B illustrates an enlarged, not-to-scale, cross-sectional side view of the superaerophilic surface sitting in water.

This invention utilizes a dual-scale topography, with structures on the microscopic and nanoscopic scales as shown in FIG. 2A-2B. When submerged in a liquid, air becomes trapped in the cavities of the engineered structures and creates a layer between the Superaerophilic Surface and the liquid. The air between the water and the Superaerophilic Surface is known as the air plastron. The air plastron acts as a protective layer inhibiting the wetting of the Superaerophilic Surface. The Superaerophilic Surface will repel water and attract air supplied by an Air Lubrication System. Conversely, when this surface is in air, water droplets on it will take on a nearly spherical shape, reducing the surfaces wettability therefore creating a hydrophobic surface.

When in air, this surface will have hydrophobic properties for an extended period. When submerged in water, the air plastron is reduced. As a result, the aerophilic and hydrophobic properties of the surface decrease. The contributing factors to air plastron reduction are the degree the Superaerophilic Surface is exposed to hydrostatic pressure exerted on the air plastron, the flow of water across the surface causes hydrodynamic pressure, and the pressures compressing and then water displacing air trapped in the microstructure cavities.

The forces opposing the air plastron reduction are the pressure of air within the cavities, air leaving the cavities and the plastron decreasing, the pressure reducing, contributing to even faster air plastron reduction, the capillary pressure of the curved gas-liquid interface, and the capillary pressure of an aerophilic surface in water that is exerted away from the surface, since the interface is convex.

Figure 3:
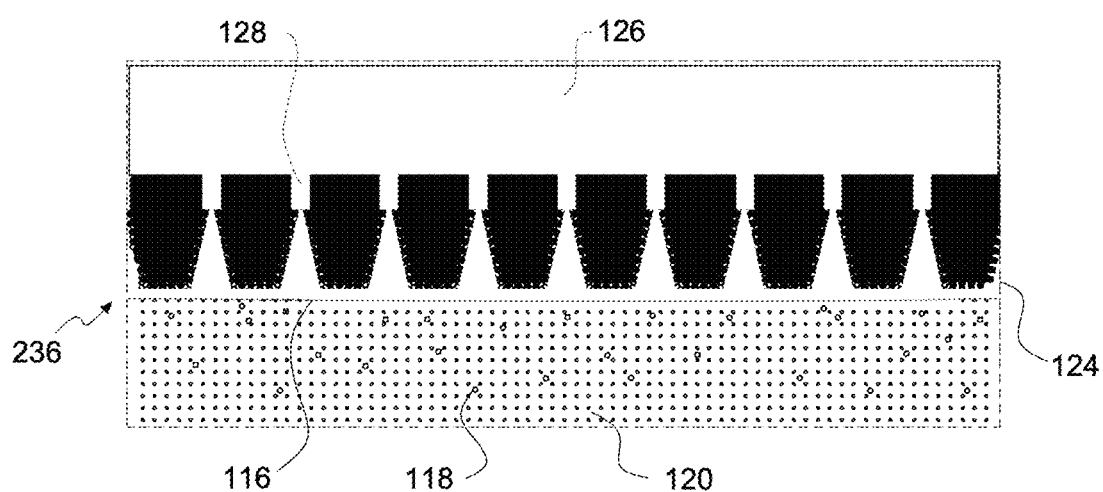
FIG. 3 illustrates an enlarged, not-to-scale, cross-sectional side view of the superaerophilic surface sitting in water, having its air plastron replenished.

To retain the aerophilic properties of the Superaerophilic Surface, this invention actively resupplies pressurized air to the air plastron by creating a layer of compressed air in between the Superaerophilic Surface and the ship's hull. Microscopic, perforated holes in the Superaerophilic Surface allow air from this layer to quickly replenish air lost due to the hydrostatic and hydrodynamic pressures. In addition surfaces of adjacent ridges of the microscopic structures, extending between an intermediate trench to a respective ridge peak/top, progressively diverge away to define a V-shaped geometry to help sustain the air plastron. FIG. 3 shows the replenishment of the air plastron from the layer of compressed air to the dual-scale structured surface.

As more air is delivered into the cavities in the Superaerophilic Surface, the pressure in the air plastron will increase, further opposing the hydrostatic and hydrodynamic pressures. As a result, the rate of air diffusion can reach equilibrium with the rate of replenishment, at which point, the air plastron is stable.

Figure 4:
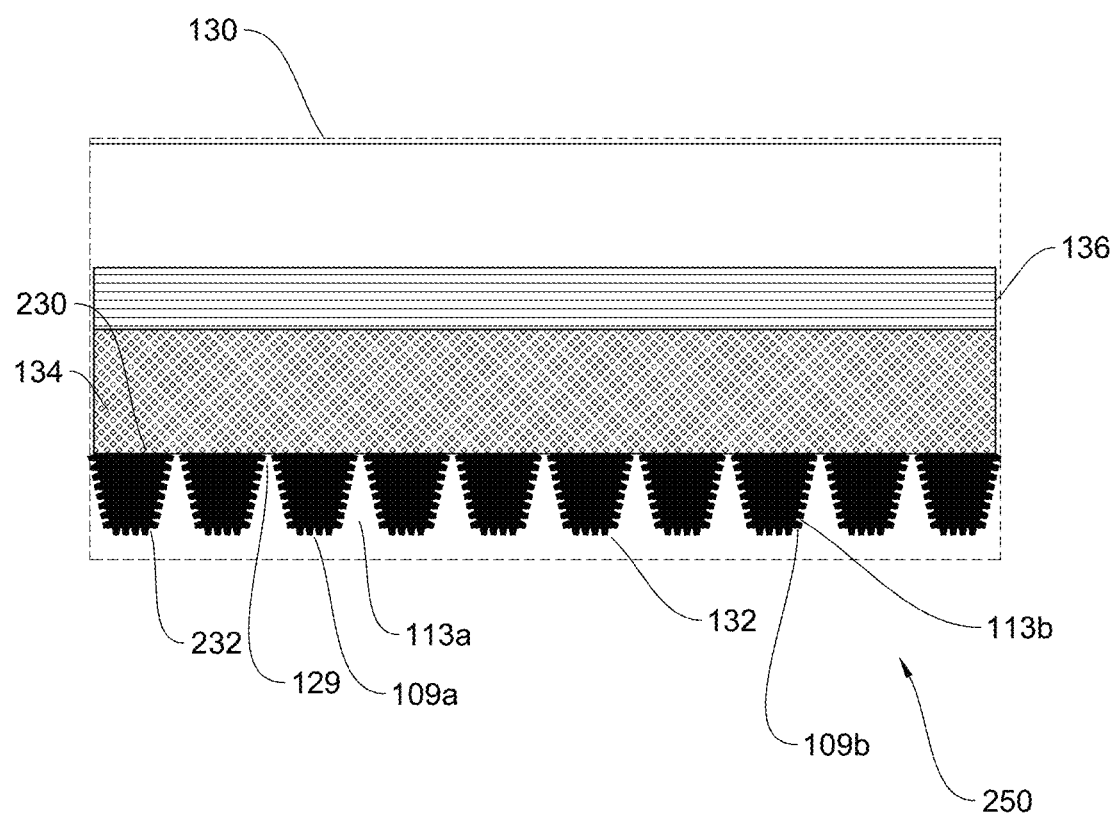
FIG. 4 illustrates an enlarged, not-to-scale, cross-sectional side view of the functional surface assembly.

In further discussion of the Functional Surface Assembly, the manufactured Superaerophilic Surface will not remain superaerophilic when submerged unless the air plastron is continuously resupplied from a layer of compressed air on the inside of the Superaerophilic Surface, as previously described. Furthermore, the alloyed surface described above cannot be applied directly to a hull because of the issues with galvanic corrosion that would ensue. To solve these problems, this invention creates a three-layered "Functional Surface Assembly." A cross-sectional view of this Functional Surface Assembly is shown in FIG. 4.

The layers comprise the outermost layer, the middle layer, and the innermost layer. The outermost layer is the Superaerophilic Surface, which has been described above extensively. The middle layer is porous. The porosity of this layer allows for the required compressed air to be evenly distributed on the inside of the Superaerophilic Surface. This layer is known as the Porous Middle Layer. Air is supplied to the Porous Middle Layer continuously at low volumes. The air in the Porous Middle Layer must be at a pressure marginally higher than the pressure of the air plastron so that it transfers through the microscopic, perforated holes in the Superaerophilic Surface. The innermost layer is the Contact Layer. This layer allows for the entire Functional Surface Assembly to be bonded to the hull without penetrating the Porous Middle Layer. The Contact Layer should not be porous to any extent. The combination of the Contact Layer and the Porous Middle Layer must be dielectric to prevent galvanic corrosion between the steel hull and the copper alloy. FIG. 5A-5C shows a three-dimensional view of the Functional Surface Assembly repelling water.

The Porous Middle Layer structure must be permeable to uniformly distribute airflow across the backside of the Superaerophilic Surface, while resisting the forces exerted on Functional Surface Assembly. The Porous Middle Layer is adhered to the copper alloy prior to laser ablation. This bond achieves a secure adhesion with the alloyed surface while maintaining a high void fraction. The porosity of the material is high to allow for minimal pressure drop across the distance between the Air Plastron Replenishment System and the microscopic perforations. The lower this change in pressure is, the more uniformly air can be distributed across the Superaerophilic Surface. Under normal operation, the Porous Middle Layer, and its connection to the Superaerophilic Surface counter the internal forces of compressed air pressure, and the external forces of shear from the vessel motion, sinkage effects, and the squat effect. If the air plastron replenishment system fails, the Porous Middle Layer will be momentarily subject to a high compression force due to hydrostatic pressure. It must withstand this force enough to resist permanent deformation.

The Contact Layer is a surface that easily and securely bonds to the hull. The Contact Layer could include a pressure sensitive side to attach to the vessel's hull or be a harder substrate that an industrial strength adhesive will bond to. The Contact Layer does not allow adhesive to penetrate the Porous Middle Layer.

The overall system includes a system for delivering air to the compressed gas in the Porous Middle Layer. A system for delivering air to the compressed gas in the Porous Middle Layer is necessary. This is known as the Air Plastron Replenishment System. This is a separate system to be used in addition to a ship's Air Lubrication System. A check valve is included to prevent a loss of pressure in the Porous Middle Layer if the Air Plastron Replenishment System fails. If the Porous Middle Layer has enough porosity to allow for uniform air distribution, the Air Plastron Replenishment System can have one injection site into the Porous Middle Layer. If the pressure drop through the Porous Middle Layer will be too great to allow for even distribution, a series of small diameter tubes can be perforated and run throughout the Porous Middle Layer to help distribute the air. Alternatively, a series of channels could be cut into the Porous Middle Layer to help distribute the air evenly.

Regarding manufacturing the Functional Surface Assembly, the Functional Surface Assembly will be produced in a series of sheets that can be applied directly to the underside of a ship's hull. These sheets can be made smaller, approximately 4 ft. by 8 ft., for potential diver-installation of the Functional Surface Assembly. Preferably, the Functional Surface Assembly would be applied to the hull in a shipyard, in which the scale of each sheet should be more on the order of 8 ft. by 100 ft. Fewer sheets are preferable as it is less likely that compressed air in the Porous Middle Layer escapes from the seams of the sheets rather than the microscopic, perforated holes. Furthermore, fewer sheets results in fewer hull penetrations.

Once the three layers are bonded together, laser ablation is used on the alloyed surface to create the Superaerophilic Surface. The laser ablation is used to create the microscopic and nanoscopic surface structures described above. A benefit of laser ablation is that material is removed quickly enough to avoid melting neighboring material. As a result, deeper cuts on very small scales are made possible. The present embodiment employs laser ablation in a precision engineering process to form microscopic-scaled grooves in the alloy surface. The laser ablation process creates laser-induced period surface structures which add a second layer of structure on the nanoscopic scale.

At regular intervals within the trough of the microscopic-scaled grooves, the laser is used to perforate microscopic holes through the alloyed surface. These holes allow compressed air from the Porous Middle Layer to be delivered to the Superaerophilic Surface. By connecting the Porous Middle Layer to the alloyed surface before ablating the Superaerophilic Surface, the laser-perforated holes in the alloyed surface can penetrate the Porous Middle Layer as well. This ensures that air within the Porous Middle Layer has a clear path to the microscopic, perforated holes in the Superaerophilic Surface.

The laser-induced period surface structures and the perforated microscopic holes are created by adjusting the laser parameters to obtain the optimum material removal process. Adjustable laser parameters for the laser ablation include the speed, focal length, and fluence (energy per area). These parameters also contribute to the hole drilling process, with the number of pulses per hole being a factor as well. Every alloy variation requires slight adjustment of these parameters.

The Contact Layer will be attached to the hull, preferably via dielectric compatibility methods. One such embodiment would use a glue or adhesive backing. This could involve a solid contact layer that is dielectric and has resin or another strong adhesive applied to it. In this instance, the contact layer must be solid to prevent this adhesive from penetrating the Porous Middle Layer. Alternatively, the contact layer could have a pressure sensitive adhesive on it and be applied to a hull similar to a sticker. Another embodiment could utilize a mechanical method using fasteners. Additionally, for new builds, the contact layer can be eliminated entirely. A proper adhesive that does not penetrate excessively into the Porous Middle Layer can be used to attach the Porous Middle Layer directly to the blocks or grand blocks of a new build. The choice of alloy can enhance anti-fouling and anti-corrosion properties. For applications on ocean going vessels, this is advantageous. Copper alloys provide these benefits. For non-marine applications in which a superaerophilic or superhydrophobic surface is required, another alloy could be chosen for its properties.

For uses where a superhydrophobic or superaerophilic surface is required, other than increasing the efficiency of a ship's Air Lubrication System, the Superaerophilic Surface can be applied to any surface. If applied underwater, the Porous Middle Layer with compressed air must be applied as well.

Figure 6A:
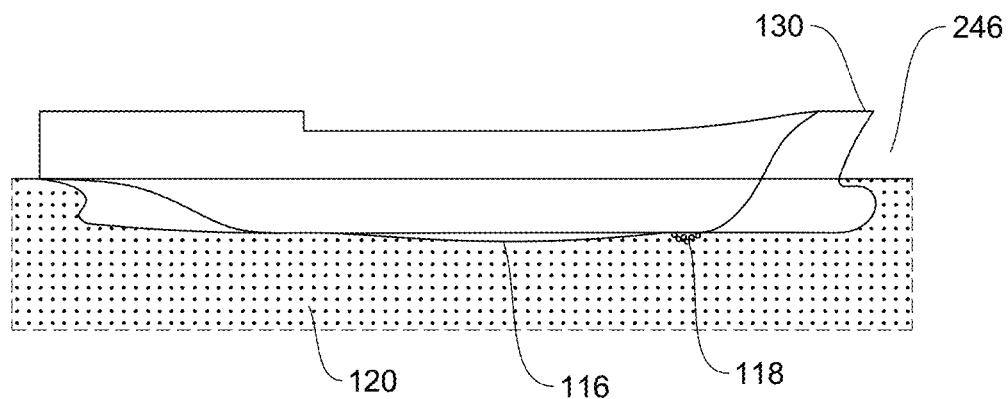
FIG. 6A illustrates a conceptual profile view of a ship using air lubrication with a superaerophilic surface covering part of its bottom.
Figure 6B:
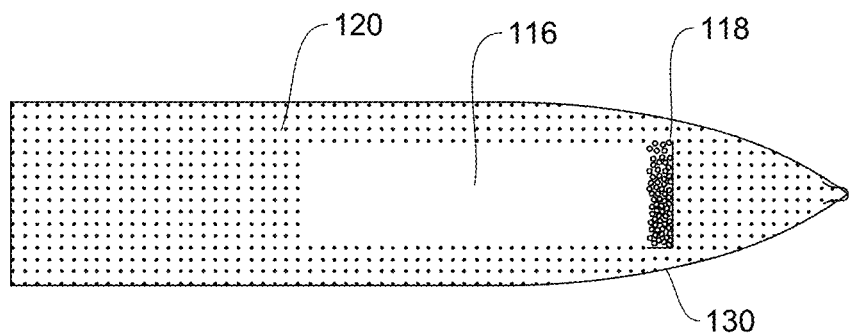
FIG. 6B illustrates a conceptual plan view of a ship using air lubrication with a superaerophilic surface covering part of its bottom.

Principles of air lubrication on a superaerophilic surface are employed. Because air has a lower dynamic viscosity than water, the frictional resistance on the portion of the hull with an air layer will be less. A superaerophilic surface will allow air from an Air Lubrication System to attach more readily to the hull, as shown in FIGS. 6A and 6B.

Figure 7A:
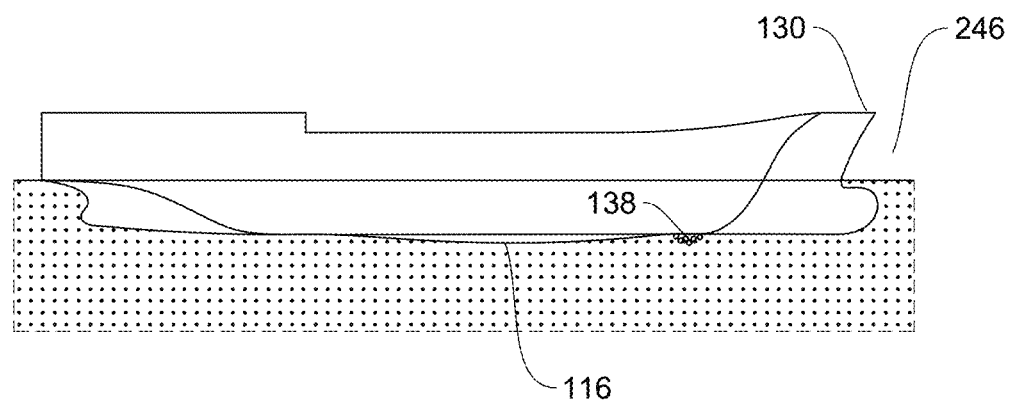
FIG. 7A illustrates a conceptual profile view of a ship using air lubrication with a superaerophilic surface covering part of its bottom.
Figure 7B:
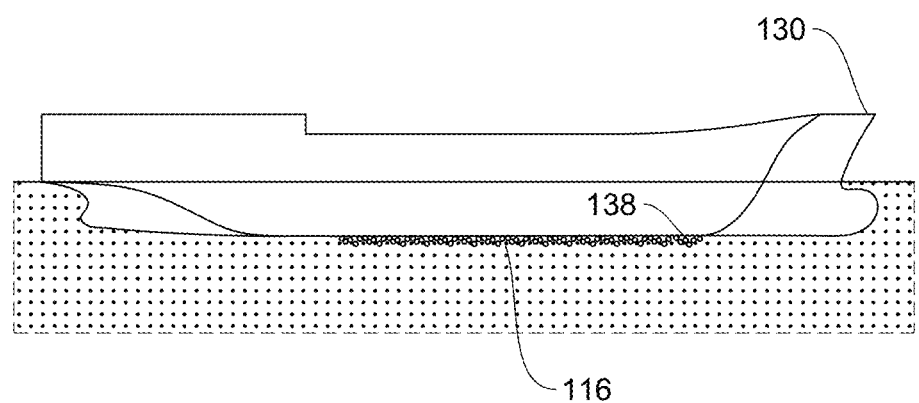
FIG. 7B illustrates a conceptual profile view of a ship using an air lubrication system on an aerophobic hull.

Injecting air bubbles reduces the frictional resistance of the hull by reducing the mean dynamic viscosity of the fluid in the vessel's boundary layer. Bubbles that leave the boundary layer do not contribute to reducing frictional drag. Creating and sustaining an aerophilic and hydrophobic surface extends the duration of time the bubbles remain in the boundary layer, thus requiring less air to be delivered to the bottom of the hull. Bubbles injected onto a surface that is not aerophilic will tend to "bounce" off the hull. To compensate for bubbles leaving the boundary layer, existing Air Lubrication System installations inject a large volume of air under the hull, which requires large amounts of compressor power to operate. The power saved from the reduced drag is offset by the parasitic power loss of the compressor. An Air Lubrication System with an aerophilic surface will require reduced compressor airflow, thereby increasing the net power reduction. FIGS. 7A and 7B show, side by side, a traditional Air Lubrication System with air bubbles and the enhanced Air Lubrication System in this invention.

In summary, this invention uses a superaerophilic surface to attract air distributed with an Air Lubrication System resulting in the Air Lubrication System needing to supply less air. A fully formed air sheet maximizes frictional drag reduction compared to air bubbles. Because the drag reduction is greater and less compressor power is required, the net power reduction increases.

Regarding the carbon-enriched air for aerophilic enhancement aspect, this invention can use carbon-enriched air to enhance the aerophilic and hydrophobic properties of the Superaerophilic Surface. This embodiment would enhance the superaerophilic properties of the Functional Surface Assembly, but is not required for the invention to exhibit superaerophilic properties.

Many experiments have attempted to create aerophilic and hydrophobic surfaces using microscopically structured surfaces. In many cases, it was found that a surface that was minimally hydrophobic or even hydrophilic in air would, over time, become more hydrophobic through the introduction of carbon molecules to the surface. Further analysis showed that carbon atoms in the air attach to the surface naturally, and lower the Surface Free Energy of it, increasing the hydrophobicity and aerophilicity of the surface.

The binding effect of carbon is used in this invention by delivering carbon-enriched air to the layer of compressed air in the Porous Middle Layer to enhance the effectiveness of the Superaerophilic Surface. Since the holes in the Superaerophilic Surface which allow air to transfer from the Porous Middle Layer to the microstructure surface are small, carbon-containing molecules such as carbon dioxide ($CO_2$) and carbon monoxide (CO) must be filtered so that only carbon molecules are delivered to the Porous Middle Layer.

Figure 8:
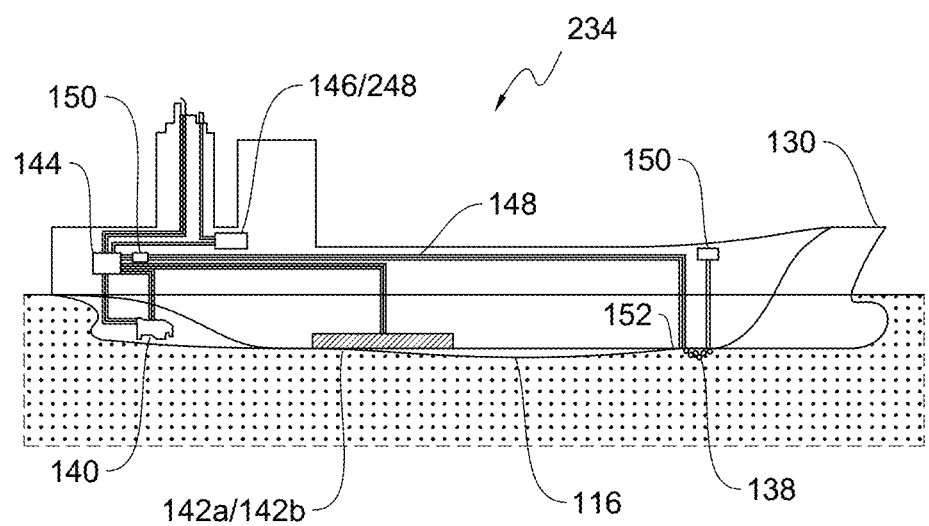
FIG. 8 illustrates a system for carbon-enriched air lubrication delivery.
Figure 9:
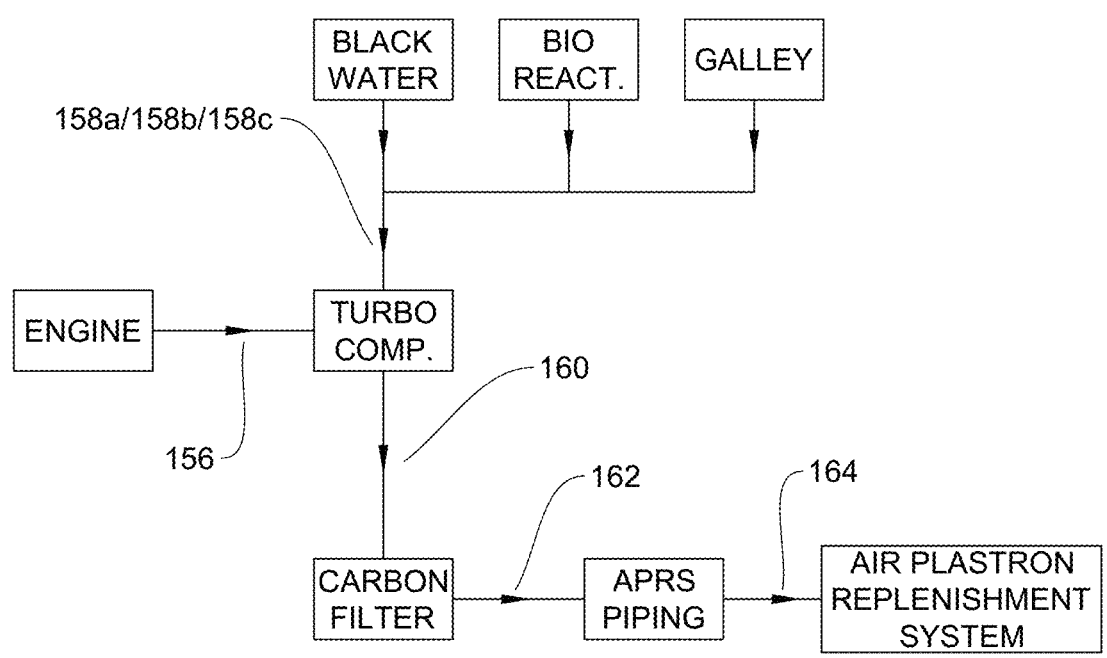
FIG. 9 illustrates a flow chart of the carbon-enrichment process.

Regarding the Carbon-Enriched Air Delivery System, this invention segregates carbon molecules from engine exhaust fumes, black water tank fumes, or galley hood fumes, then uses the filtered carbon molecules to supply carbon-enriched gas to the Functional Surface Assembly. The carbon supply enhances the aerophilic and hydrophobic properties of the Superaerophilic Surface. FIG. 8 shows an example simplified piping schematic while FIG. 9 shows a flow chart of the carbon filtering and delivery process.

Engine exhaust fumes include carbon oxides like carbon monoxide (CO) and carbon dioxide ($CO_2$). For engines using heavy fuel oil, $CO_2$ composes about 600,000 ppm (6%) of the exhaust, while CO composes 60 ppm (0.00006%). Although $CO_2$ comprises a much higher percent of the exhaust gas, it is a stable molecule that is difficult to extract carbon atoms from. CO, although less abundant, is unstable and easy to extract individual carbon atoms.

For regular air, $CO_2$ composition is only 0.033% while only trace amounts of CO can be found. The high concentrations of carbon oxides found in a ship's waste stream are a very accessible and efficient source of carbon for the air plastron replenishment.

Hydrocarbons like methane ($CH_4$) from the black water tanks, bioreactors, and the galley hood are also utilized. The percentage of methane present in these fumes varies widely, but in general, is high enough for useful amounts of carbon to be extracted. When methane exceeds 5% of the volume of air, it becomes prone to explosion. Numerous shipboard accidents have occurred as a result. An added benefit of this invention is to minimize the amount of methane accumulation in the blackwater tanks.

Figure 10:
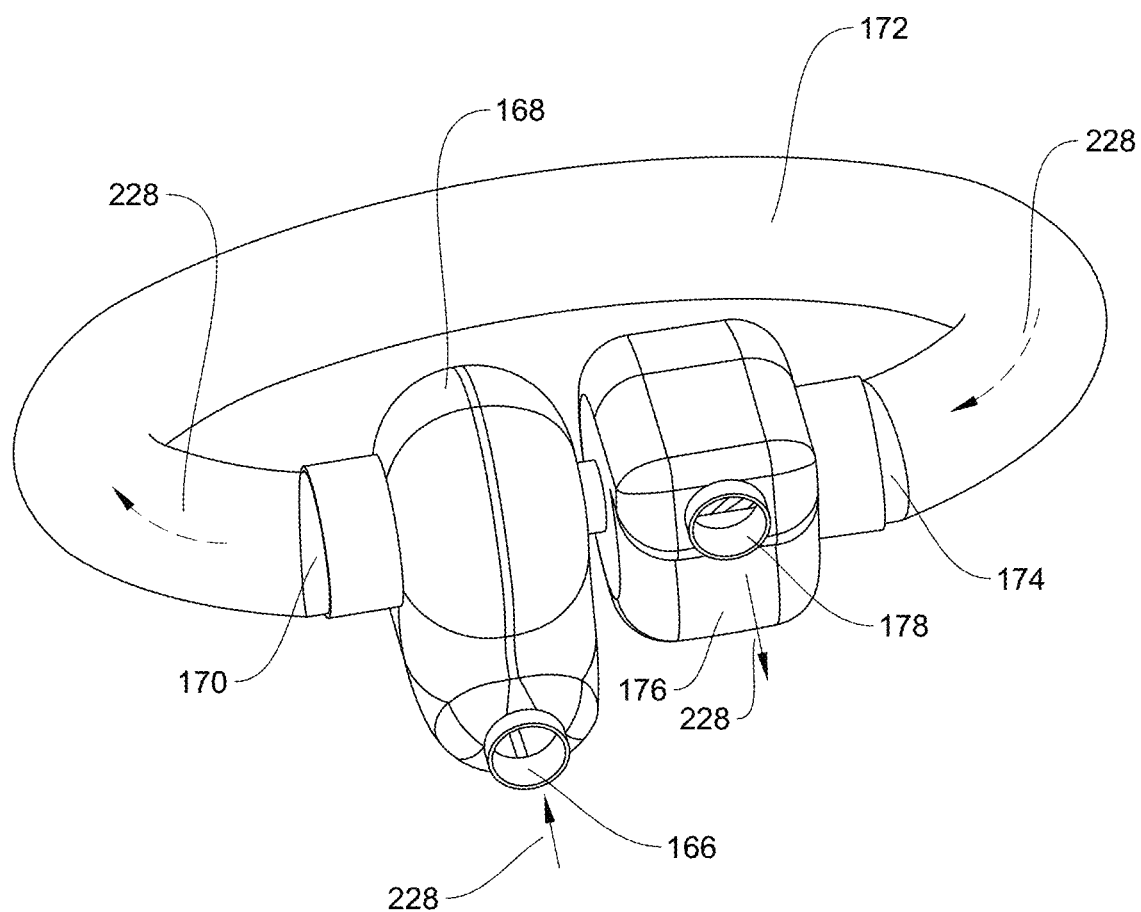
FIG. 10 illustrates the turbocharger with the added exhaust gas rerouting pipe.

The present invention seeks to provide a solution to these problems by rerouting the carbon-rich engine exhaust to replenish the air plastron. This is done by rerouting the ship's exhaust gas via a turbocharger, using the engine's wasted heat, to the Functional Surface Assembly. A turbo compressor, as shown in FIG. 10 is powered by the ship's engine exhaust, which it then reuses and compresses to supply the air plastron with carbon-rich gas. The carbon activates the hull's aerophilic surface properties. To build this turbo compressor, either flexible, heat-resistant tubing is used to connect the turbine output to the compressor input, or solid piping, with exact dimensions to fit the turbine-compressor assembly. The connection point needs to be appropriately sealed to avoid any exhaust fumes leaking out.

If engine boosting is also desired and only a small carbon-rich gas supply is necessary, a parasitic compressor can be built into the exhaust pipe just behind and connected to the turbine of the regular engine turbocharger. A parasitic compressor can be made by altering a standard car turbocharger. The central shaft is extended to power a second, smaller compressor which sits inside the turbine exhaust pipe and draws its air intake from the exhaust of the turbine. FIG. 11 shows a concept drawing for this embodiment. Any turbine exhaust not used by the parasitic compressor must be allowed to freely flow around the parasitic compressor housing. Hence the parasitic turbocharger should be smaller than illustrated in FIG. 11 to not restrict turbine exhaust flow excessively, which would cause backpressure effects. Alternatively, the exhaust pipe diameter could be increased for the section containing the parasitic compressor. The parasitic compressor is best used if only small amounts of carbon-rich air are required, and space is a concern. It should also be noted that enlarging the parasitic compressor will result in a loss of regular turbocharger output pressure.

To build this device, the central shaft is extended into the exhaust pipe, and the parasitic turbo compressor is mounted on the extension. Next, the position of the parasitic compressor output port is marked on the exhaust pipe (which is not yet mounted). An appropriately shaped hole is cut into the exhaust pipe wall. The exhaust pipe is slid over the parasitic compressor, so the parasitic compressor's output port exits the exhaust pipe through the hole that was cut and aligned with the turbine output port. The gap is sealed by welding a top sleeve over it. This sleeve must be on the exhaust pipe before installation and slid over the gap and welded after installation. The output of the parasitic compressor is welded into the exhaust pipe wall. If possible, this welding operation is done with the exhaust pipe in a vertical position so the gravity acting on the parasitic compressor does not create a bending moment on the central shaft. If a vertical position for the welding is not possible the described bending moment has to be adjusted for otherwise or the shaft alignment may not be ideal. Depending on the weight of the parasitic compressor and the diameter and stiffness of the central shaft, the misalignment may cause excessive friction or prevent the shaft from spinning at all.

Adding a carbon filter to separate the carbon-containing gases from the rest of the exhaust increases carbon concentration. It is critical that the carbon rich gas supplied to the Superaerophilic Surface does not contain particulates large enough to plug the laser ablated microscopic perforations. Unfiltered exhaust gas will likely plug these perforations, resulting in a degradation of the Superaerophilic Surface and potentially making it non-functional.

The carbon filter can be seen in FIG. 12. In reference to FIG. 12, the gas will enter the outer casing via the lid with a permanently attached intake pipe. The pressure in intake pipe will force the gas against the carbon-sensitive membrane, which is mounted inside the inner chamber. The membrane will allow carbon-containing molecules to pass. The remaining gas will fill the inner chamber and flow out the top, around the sides to the bottom where it can exit through the carbon-reduced outlet. The reduced carbon outlet pipe is permanently fused to the outer chamber, ensuring a permanent complete seal. The carbon-rich gas can exit the inner chamber through the carbon-rich gas outlet.

It is vital that the intake provides sufficient pressure to force gases through the membrane, but not too much to where the impact of the gas would cause damage. Also, the carbon-reduced outlet must have a pressure relief valve installed. This will maintain the pressure in the chamber needed to force gas through the membrane, but release gas that did not pass through the membrane to prevent over-pressurizing the chamber. The gas being released through the carbon-reduced outlet will still contain some carbon gases, but in a much lower concentrations than the original exhaust.

The inner chamber with the carbon membrane will be exchangeable. This allows for replacement of the filter, increasing efficiency over the lifetime of the system. The three threaded connections in the filter require a good seal. The threaded connection of the lid has an inbuilt O-ring and push-to-open locking mechanism. The other two threaded connections consist of where the carbon-rich outlet pipe penetrates the outer and inner casings. These two connections require applying a high-temperature thread sealant. The thread of the inner chamber is smaller than that of the outer casing to ensure the thread sealant intended for sealing the inner chamber will not be removed while passing through the outer casing. Leakage from the inner chamber into the outer casing via carbon-rich outlet pipe would result in the loss of carbon-rich gas back into the reduced-carbon air making the filter less efficient. Leakage from the outer casing either via lid or carbon-rich outlet pipe would be equivalent to an exhaust pipe leak. Regular inspection and replacement of the O-ring is required.

Double piping may be utilized if a ship's CO concentrations are likely to be dangerously high. The space between the outer pipe and the inner pipe is reduced to sub-atmospheric pressure and a pressure sensor is installed. If CO leaks from the inner pipe, the pressure will rise and trigger the alarm. If this happens, the supply of exhaust fumes can be cut off with an automated valve and the air plastron replenishment can temporarily be run using ambient air that is not carbon-enriched.

There are also other benefits and applications of the system herein. In addition to increasing the efficiency of Air Lubrication Systems and reducing hull frictional drag, this invention will have anti-fouling properties. Marine organisms require moisture to grow on a surface, thus the superaerophilic surface remains dry and is uninhabitable to marine organisms. The reduction of fouling will further decrease drag therefore increasing the efficiency of the ship over its lifetime.

Air bubble curtains along the hull underwater have been proven to provide radiated noise mitigation. This invention could aid in the reduction of noise pollution from ships and have potential military applications.

As such, the system and method for reducing drag on hulls of marine crafts, thereby increasing fluid dynamic efficiencies, of the present invention may be used to reduce drag on hulls of marine crafts, provide a replaceable surface that can temporarily adhere to a hull of a marine craft and be reapplied in regular dry dock or in-water maintenance, and provide a system that repurposes exhaust fumes into an anti-frictional gaseous layer capable of reducing drag on a ship's hull, thereby increasing energy efficiency of the marine craft and decreasing the emissions of greenhouse gasses because of the reduced fuel consumption. This apparatus and system are particularly shown in FIGS. 1A-13.

FIGS. 1A-1D illustrate the concept of contact angle as it relates to the aerophilicity and hydrophobicity of a surface. FIG. 1A shows a surface that is superhydrophilic 102 when in air and superaerophobic when in water. In the top drawing, the contact angle of the water droplet on the surface surrounded by air is θ<5°. In the bottom drawing, the contact angle of the air pocket on the same surface surrounded by water is θ>150°. FIG. 1B shows a surface that is hydrophilic 104 when in air and aerophobic when in water. In the top drawing, the contact angle of the water droplet on the surface surrounded by air is 5°<θ<90°. In the bottom drawing, the contact angle of the air pocket on the same surface surrounded by water is 90°<θ<150°. FIG. 1C shows a surface that is hydrophobic 106 when in air and aerophilic when in water. In the top drawing, the contact angle of the water droplet on the surface surrounded by air is 90°<θ<150°. In the bottom drawing, the contact angle of the air pocket on the same surface surrounded by water is 5°<θ<90°. FIG. 1D shows a surface that is superhydrophobic 108 when in air and superaerophilic when in water. In the top drawing, the contact angle of the water droplet on the surface surrounded by air is θ>150°. In the bottom drawing, the contact angle of the air pocket on the same surface surrounded by water is θ<5°.

FIGS. 2A-2B illustrate a not-to-scale representation of the laser-ablated alloy's surface topography with structures created at the microscopic and nanoscopic scale, which creates a superaerophilic surface. FIG. 2A shows this surface sitting in air, while FIG. 2B shows this surface surrounded by water. As may be appreciated in FIGS. 2A-2B, shown are the microscopic-scaled ridges 110 left after creating laser ablated grooves, nanoscopic-scaled structures 112 induced by the laser, air 114 in which the embodiment shown in FIG. 2A sits, the created air plastron 116, air bubble 118 that can penetrate the microscopic and nanoscopic-scaled surface and repel water, and water 120 in which the embodiment shown in FIG. 2B sits. In addition, further shown are water droplets 122 sitting on top of the surface surrounded by air. The water droplet 122 in this form has very little interface with the surface, minimizing the wetting of the surface. The air within the grooves helps keep the water from penetrating them FIG. 3 illustrates the not-to-scale created superaerophilic surface, with microscopic and nanoscopic-scaled surface structures, having its air plastron replenished through microscopic, perforated holes. As may be appreciated in FIG. 3, shown are the superaerophilic surface 124, with microscopic and nanoscopic-scaled surface structures, a layer of compressed air 126 sitting on the inside of this surface 124, a laser-drilled microscopic hole 128 through which compressed air can transfer, the micro-bubble air plastron 116 that forms on the surface 124, the water 120 in which the surface exists, and an air particle 118 that has escaped the air plastron 116 due to hydrostatic and hydrodynamic pressure.

FIG. 4 illustrates the created functional surface assembly. This assembly attaches to the ship's hull and has three layers. As may be appreciated in FIG. 4, shown are the ship's hull 130, the outermost layer 132, which is the superaerophilic surface with microscopic and nanoscopic scale structures and microscopic, perforated holes, and the Porous Middle Layer 134. This Porous Middle Layer 134 allows compressed air to be held in it to then be delivered through the microscopic, perforated holes to the superaerophilic surface. Finally, the innermost layer 136, the Contact Layer, is shown. The Contact Layer 136 allows for the entire functional surface assembly to be attached to the ship's hull without adhesive penetrating the Porous Middle Layer 134.

FIGS. 5A-5C illustrate a conceptualized rendering of the created functional surface assembly applied to the bottom of a ship's hull. An air layer exists between the outermost layer, the superaerophilic surface, and the water. FIG. 5A shows an isometric view, FIG. 5B shows a side view, and FIG. 5C shows a close-up of the superaerophilic surface topography. As may be appreciated in FIGS. 5A-5C, shown are the ship's hull 130, the Contact Layer 136, the Porous Middle Layer 134, the Superaerophilic Surface 124, the water in which the ship floats 120, the microscopic-scaled structure 110, the nanoscopic-scaled structure 112, a microscopic hole 128 that allows compressed air in the porous middle layer to permeate to the superaerophilic surface and join the air layer, and the air layer 116, or air plastron, which exists in the grooves and valleys of the microscopic scale and nanoscopic scale structure. This air layer prevents any wetting of the surface.

FIG. 6A shows a profile view and a FIG. 6B shows a plan view of a ship using air lubrication with a superaerophilic surface covering part of its bottom. The air, after initially being injected, wants to remain attached to the superaerophilic surface of the hull. As may be appreciated in FIGS. 6A-6B, shown are the ship's hull 601, the air bubbles 118 released at the air injection, the air 116 attached to the hull 130 over the area covered by the superaerophilic surface, and the surrounding water 120.

FIG. 7A shows an air lubrication system used on a vessel with a superaerophilic surface, and FIG. 7B shows an air lubrication system on an aerophobic hull. As may be appreciated in FIGS. 7A-7B, shown are the ship's hull 130, the air injection site 138, the sustained air plastron 116 on the hull 130 with a superaerophilic surface, and air bubbles 118 bouncing off a hull using air lubrication over a traditional bottom.

FIG. 8 illustrates a simplified system for carbon-enriched air lubrication delivery. As may be appreciated in FIG. 8, shown are the ship's hull 130, the main engine 140, the blackwater tanks/bioreactors 142a/142b, the galley fume system 146, the piping 148 that delivers carbon-enriched air to the Air Plastron Replenishment System, the carbon filter 150, the gas injection site 152 for the carbon-enriched air being delivered to the Functional Surface Assembly's air plastron, a regular air compressor 144/176 for the ship's Air Lubrication System, the air injection site 138 for the air lubrication, and the created air sheet 116 on the ship's hull. Also shown is the air compressor 144, which drives exhaust from the main engine and fumes from the blackwater tanks, bioreactors, and galley to the Air Plastron Replenishment System.

FIG. 9 illustrates a flow chart of the carbon-enrichment process. As may be appreciated in FIG. 8, shown are the engine exhaust gas 156, and carbon-rich gases 158a/158b/158c from other shipboard sources: the black water tanks, grey water tanks, and galley. Also shown is a combination of the gases 160 from the carbon-rich gases 158a/158b/158c and the exhaust from the engine exhaust gas 156 that has been moved through a turbo compressor. Further shown is a carbon-enriched air 162 that has passed through a carbon filter, and a carbon-enriched air 164 that is delivered to the bottom of the hull.

FIG. 10 illustrates a simple drawing showing a regular turbocharger with the added exhaust gas rerouting pipe. As may be appreciated in FIG. 10, shown are the exhaust gas inlet 166, the turbine 168, the first exhaust rerouting pipe 170, the second exhaust rerouting pipe 172, the compressor air intake 174, the compressor 176, and the outlet to air plastron replenishment 178. Exhaust enters the intake 166, spins the turbine 168, and exits the turbine at the first exhaust rerouting pipe 170. Then it travels through the second exhaust rerouting pipe 172 to the compressor intake 174. It gets compressed in the compressor 176 and exits through the outlet 178 to the air plastron replenishment.

Figure 11A:
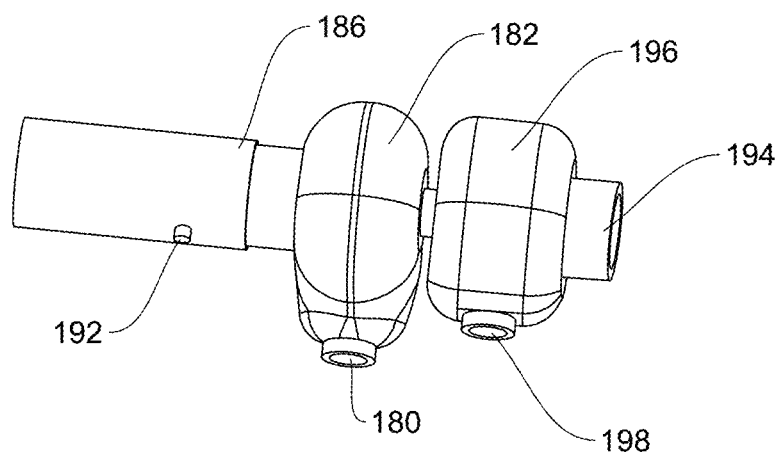
FIG. 11A illustrates a parasitic compressor inserted into the turbine exhaust pipe.
Figure 11B:
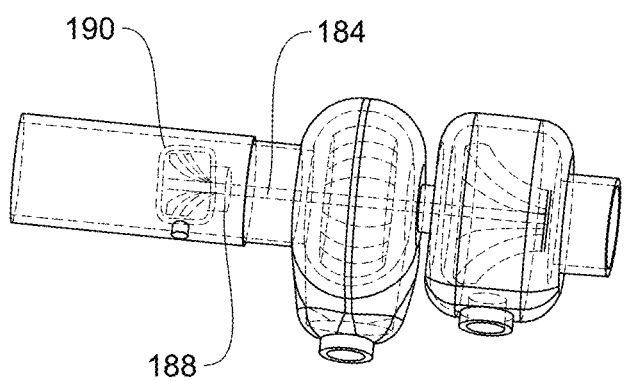
FIG. 11B illustrates a parasitic compressor inserted into the turbine exhaust pipe, with internal components shown in phantom.

FIGS. 11A and 11B illustrate how a parasitic compressor could be inserted into the turbine exhaust pipe to also use the rotational energy created by the turbine and use the turbine's exhaust as intake. As may be appreciated in FIGS. 11A and 11B, shown are the engine exhaust 180 entering the turbine intake, the turbine 182, the central shaft 184, the turbine exhaust pipe 186, the parasitic compressor intake 188 drawing turbine exhaust, the parasitic compressor 190, the parasitic compressor output 192 to the Functional Surface Assembly, the regular compressor intake 194 drawing clean air, the regular compressor 196, and the regular compressor output 198 to an engine air intake. The output 192 will be compressed carbon-rich air, which can be used for maintaining the Functional Surface Assembly. The parasitic compressor is drawn larger for illustrative purposes. The central shaft 184 may also have a smaller radius on the parasitic compressor side than on the regular compressor 196 side. The regular compressor will intake clean air in an intake 194 and output compressed clean air through an output 198 to the engine air intake. The turbine 182 is driven by engine exhaust 180 entering at the turbine intake.

Figure 12A:
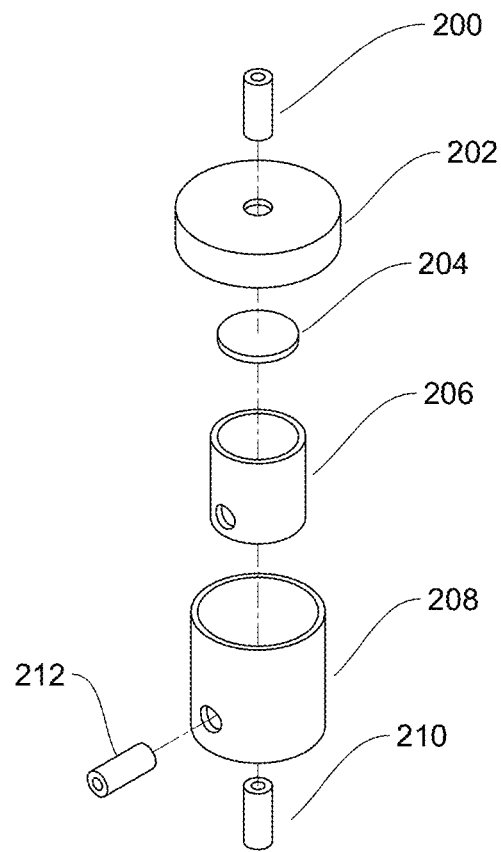
FIG. 12A illustrates an exploded isometric view of the main parts of the filter assembly.
Figure 12B:
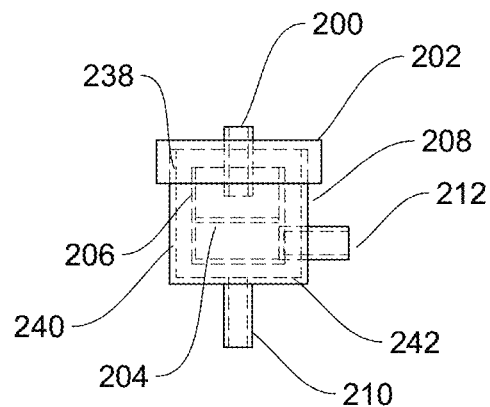
FIG. 12B illustrates a side view of the main parts of the filter assembly, with internal components shown in phantom.

FIGS. 12A-12B illustrate the main parts of the filter assembly. FIG. 12A is an assembly view, and FIG. 12B is a side view of the assembled filter with internal components shown in phantom. As may be appreciated in FIGS. 12A-12B, shown are the intake 200, the lid 202, the carbon admitting membrane 204, the inner chamber 206, the outer casing 208, the bypass outlet 210, and the carbon-rich air outlet 212. The outer casing 208 is open on the top and has two holes, one on the bottom and one on the side, to allow the outlet pipes 210/212 to be inserted. The lid 202 is securely screwed onto the outer casing. It has an O-ring and push-to-open locking mechanism (not pictured) to ensure a secure and airtight seal. Inside the outer casing is the inner chamber 206. It is offset from the bottom and side, by any means, which could be small standoffs attached to the outer wall of the inner chamber to keep it centered within the outer casing. The inner chamber is also open on the top and has one hole on the side that is aligned with the side hole of the outer casing, and both are positioned to be in the lower section of the inner chamber. Inserted in the inner chamber is a carbon-sensitive membrane 204. This membrane is positioned above the side holes and will allow carbon-rich air to pass while rejecting the other components. Three pipe connections are built in. The first connection, the air intake 200, is permanently fused to the lid entering through the top. It will insert exhaust gases into the inner chamber providing sufficient pressure to force the carbon molecules in the exhaust through the membrane, but not too much pressure, as it is preferable to not damage the membrane. The second pipe, the air outlet 212, connection is through the side into the inner chamber. Through this pipe, the carbon-rich air that passed through the membrane will be allowed to exit. The third pipe 210 connection is on the bottom through the outer casing only and will allow the air that did not pass through the membrane to exit. This exit pipe needs to have a pressure release valve installed (not pictured), to prevent over-pressurization of the filter chamber.

Figure 13:
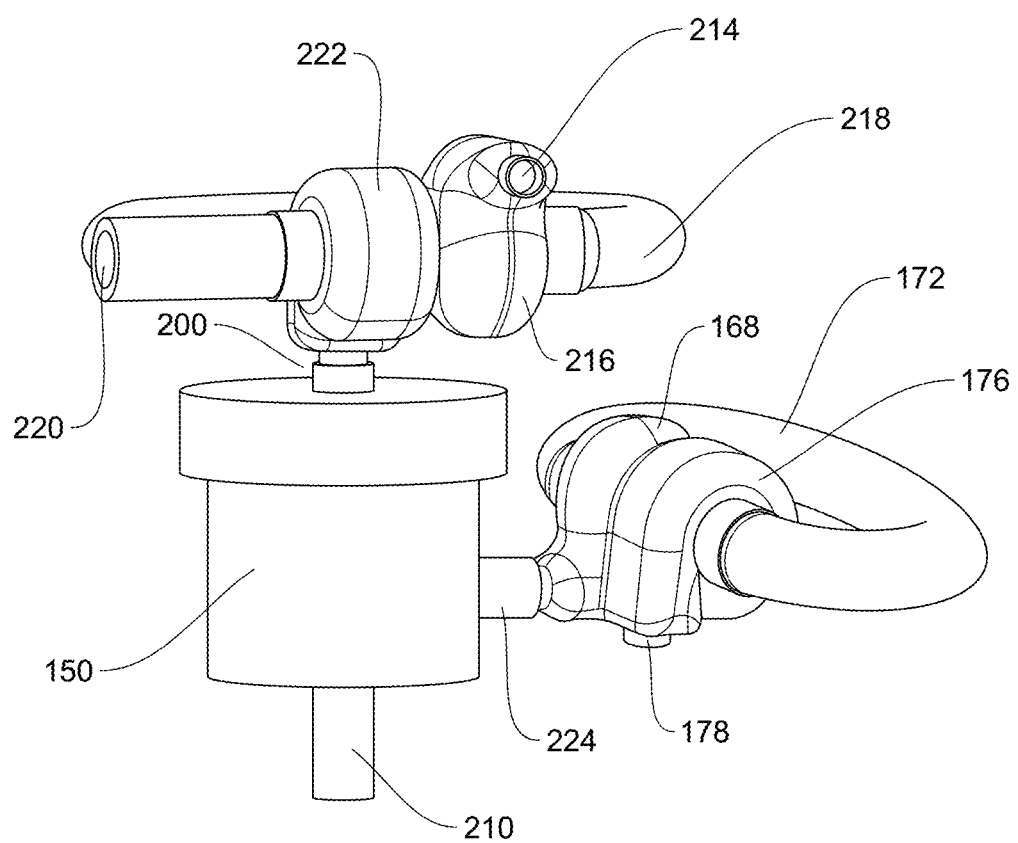
FIG. 13 illustrates a two-stage device for integrating fumes into the system.

FIG. 13 illustrates a possible two-stage device with black water, bioreactor, or galley hood fumes being added in the first stage and including a carbon filter between stages one and two. The second stage raises the pressure past the limits imposed by a carbon filter. As may be appreciated in FIG. 11, shown are the engine exhaust input 214, the first-stage turbine 216, an exhaust rerouting pipe 218, a mixing area 220 where the additional gases (from black water, bioreactor, or galley fumes) are mixed in, the first-stage compressor 222, the filter inlet 200, the carbon filter 150, the filter bypass outlet 210, an area 224 is where carbon-rich gases enter the second-stage turbine, the second-stage turbine 168, a gas rerouting pipe 172, the second-stage compressor 176, the exit 178 to the air plastron replenishment. Engine exhaust enters at the engine exhaust input 214, pushes a first-stage turbine 216, and moves through an exhaust gas rerouting pipe 218, where it gets mixed with additional gases via an intake mixing area 220. These combined gases enter a first-stage compressor 222, which leads through the filter inlet 200 into a carbon filter 150. After separation, gasses that did not pass through the filter exit through the bypass outlet 210 and carbon-enriched gases leave through the outlet area 224. The carbon-rich gases enter a second-stage turbine 168. After spinning the second-stage turbine 168, these carbon-rich gases travel through a rerouting pipe 172 to a second-stage compressor 176 and exit to the air plastron replenishment exit 178.

In an exemplary embodiment, a system for reducing frictional drag on a hull of a marine craft is disclosed, as shown in FIGS. 1-13. The system includes a multi-layer air lubrication system 236. The multi-layer air lubrication system 236 has at least three layers 132/134/136, wherein the at least three layers 132/134/136 includes an outermost layer 132 having a constructed superaerophilic inducing surface 124 a porous layer 134 facilitating an exchange of a gaseous supply to the outermost layer 132, and a contact layer 136 for bonding the multi-layer air lubrication system 236 to a hull 130 of a marine craft. In some embodiments, the contact layer 136 is a solid material affixed to the hull 130 of a marine craft with glue or adhesive backing. The constructed superaerophilic inducing surface may be laser ablated, but in other embodiments, may be constructed using chemical vapor deposition, thermal spray, or other techniques capable of precisely etching the surface. In some embodiments, the contact layer 136 includes a pressure sensitive adhesive applied to affixed to the hull 130 of a marine craft.

The system also includes at least one gaseous injection point 138 in the porous layer 134 for receiving a gaseous supply and an air distribution and replenishment system 234, as shown in FIG. 8, and as may be appreciated in more detail in FIGS. 5A, 5B, and 5C, providing the gaseous supply to the porous layer 134. In some embodiments, the injection point may include several smaller injection tubes to provide even disbursement throughout the porous layer 134. The air distribution and replenishment system 234 comprises a compressor 144/176 for supplying gas at a pressure marginally above the pressure exerted from water 120 on the air plastron 116 to ensure continued facilitation of air disbursement.

In some embodiments, the superaerophilic inducing surface 124 of the multilayer air lubrication system 236 of the system for reducing frictional drag on a hull of a marine craft also includes a metallic surface 115. In some embodiments, this metallic surface is constructed of copper to provide antifouling properties. The metallic surface 115 has a plurality of superaerophilic inducing microscopic 110 and nanoscopic structures 112 etched within the metallic surface 115 from laser ablation. Each superaerophilic inducing microscopic structure 110 of the plurality of superaerophilic inducing microscopic and nanoscopic structures defines a trench 113a and a ridge 109a geometry. Each superaerophilic inducing nanoscopic structure 112 of the plurality of superaerophilic inducing microscopic and nanoscopic structures defines a trench 113b and a ridge 109b geometry in a sidewall 111 of each of the superaerophilic inducing microscopic structures 110. In addition, surfaces of adjacent ridges of the microscopic structures 110, extending between an intermediate trench 113a to a respective ridge peak/top 109a, progressively diverge away to define a V-shaped geometry to help sustain the air plastron. The metallic surface 115 has a plurality of apertures 128 in at least an innermost point 129 in the trench 113a and ridge 109a geometry of the superaerophilic inducing microscopic structure, wherein each aperture 128 in the plurality of apertures is configured to pass supplied air from an interior side 230 of the metallic structure 115 to a wet side 232 of the metallic structure 115, thereby creating an air plastron 116 when engaged, as may be seen in FIGS. 4, 5A, 5B, and 5C.

In some embodiments, the gaseous supply consists of filtered carbon gases, including at least carbon dioxide, carbon monoxide, and methane, to enhance aerophilic and hydrophobic properties of the superaerophilic surface. The gaseous supply may be obtained from at least one of external atmosphere, engine 140 exhaust 156, black water tank 142a fumes 158a, bioreactor 142b exhaust 158b, and galley hood 146 fumes 158c, whereby the gaseous supply is rerouted from the at least one of external atmosphere, engine exhaust, black water tank fumes, bioreactor exhaust, and galley hood fumes through a turbocharger 248 to a compressor input 174 in the compressor 176, whereby the compressor 176 supplies the air distribution and replenishment system 234, which may be seen and appreciated from FIG. 10, which also shows the airflow 228.

In some embodiments, the system for reducing frictional drag on a hull of a marine craft further includes a carbon filter 150. In some embodiments, the carbon filter 150 has at least an outer casing 208, a lid 202, an intake pipe 200, and an interchangeable carbon-sensitive membrane 204 configured to allow carbon molecules to pass through the interchangeable carbon-sensitive membrane 204, whereby remaining gas molecules that are not able to pass through the interchangeable carbon-sensitive membrane 204 collect and filter out through a top 238 and around the sides 240 to a bottom 242 where the molecules can exit through a carbon-reduced outlet 212. This may be appreciated from FIGS. 12A-12B.

In some embodiments, the system for reducing frictional drag on a hull of a marine craft further includes a valve (not shown, but should be understandable to a person of ordinary skill in the art) within the in the air replenishment system 234 to prevent loss of pressure if air replenishment system 234 fails.

In another exemplary embodiment of the invention, as may be seen in FIGS. 2A-5C, a superaerophilic inducing surface 124 for use in reducing hydrodynamic drag on a hull of a marine craft is disclosed. The superaerophilic inducing surface 124 for use in reducing hydrodynamic drag on a hull of a marine craft includes a metallic surface 115. The metallic surface 115 has a plurality of superaerophilic inducing microscopic 110 and nanoscopic 112 structures etched within the metallic surface 115 from laser ablation. Each superaerophilic inducing microscopic structure 110 of the plurality of superaerophilic inducing microscopic and nanoscopic structures defines a trench 113a and a ridge 109a geometry. Each superaerophilic inducing nanoscopic structure 112 of the plurality of superaerophilic inducing microscopic and nanoscopic structures defines a trench 113b and a ridge 109 geometry in a sidewall 111 of each of the superaerophilic inducing microscopic structures 110. In addition, surfaces of adjacent ridges of the microscopic structures 110, extending between an intermediate trench 113a to a respective ridge peak/top 109a, progressively diverge away to define a V-shaped geometry to help sustain the air plastron. The metallic surface 115 also has a plurality of apertures 128 in at least an innermost point 129 in the trench and ridge geometry of the superaerophilic inducing microscopic structure, wherein each aperture 128 in the plurality of apertures is configured to pass supplied air from an interior side 230 of the metallic structure 115 to a wet side 232 of the metallic structure 115, thereby creating an air plastron 116 when engaged. To further promote antifouling characteristics, copper may be used as the material of the metallic surface 115.

In some embodiments, the porous layer 134 is configured to withstand the pressure exerted by the air plastron 116 and water 120 surrounding it, while maintaining its shape to allow a free flow of gasses to the plurality of apertures 128.

In yet another exemplary embodiment, a method of reducing frictional drag on a marine craft hull 130, thereby increasing its efficiency, is discloses. The method comprising the steps of at least configuring a marine craft hull 130 for reduced frictional drag by providing a superaerophilic inducing surface 124, wherein the superaerophilic inducing surface 124 comprises a metallic surface 115 having a plurality of superaerophilic inducing microscopic 110 and nanoscopic structures 112 etched within the metallic surface 115 from laser ablation, wherein each superaerophilic inducing microscopic structure 110 of the plurality of superaerophilic inducing microscopic and nanoscopic structures defines a trench 113a and a ridge 109a geometry and each superaerophilic inducing nanoscopic structure 112 of the plurality of superaerophilic inducing microscopic and nanoscopic structures defines a trench 113b and a ridge 113b geometry in a sidewall 111 of each of the superaerophilic inducing microscopic structures 110, wherein surfaces of adjacent ridges of the microscopic structures 110, extending between an intermediate trench 113a to a respective ridge peak/top 109a, progressively diverge away to define a V-shaped geometry to help sustain the air plastron, and the metallic surface 115 includes a plurality of apertures 128 in at least an innermost point 129 in the trench 113a and ridge 109a geometry of the superaerophilic inducing microscopic structure 110, wherein each aperture 128 in the plurality of apertures is configured to pass supplied air from an interior side 230 of the metallic structure 115 to a wet side 232 of the metallic structure 115, thereby creating an air plastron 116 when engaged, as may be seen in FIGS. 2A-5C.

In some embodiments of the method of reducing frictional drag on a marine craft hull 130 the superaerophilic inducing surface 124 in the step of configuring a marine craft hull 130 for reduced frictional drag by providing a superaerophilic inducing surface 124, is applied. The surface 124 is applied by a) bonding at least three layers 132/134/136 together, wherein the at least three layers 132/134/136 comprise the outermost superaerophilic inducing surface layer 132/124, a middle porous layer 134, and an inner contact layer 136, thereby forming a functional surface assembly 250, b) using laser ablation on the outermost superaerophilic inducing surface layer 132/115 to create the superaerophilic surface 124, whereby superaerophilic properties are obtained by creating the microscopic 110 and nanoscopic surface structures 112 comprising grooves 244 etched into the surface 115, c) creating laser-induced period surface structures 124 thereby adding a second layer of structure on the nanoscopic scale, d) creating the plurality of apertures 128 by perforating microscopic holes through the outermost superaerophilic inducing surface layer 124 at regular intervals within a trough created by the trench 113a and ridge 109a geometry of the microscopic-scaled grooves 244 using the laser, and d) configuring at least one gaseous injection point 152 in the middle porous layer ###for receiving a gaseous supply.

In some embodiments, the method further comprises the step of applying the superaerophilic surface 124 to the marine craft hull 130 by engaging an adhesive affixed to the contact layer 136 against the marine craft hull 130.

In some embodiments, the method further comprises the step of providing an air distribution and replenishment system 234 comprising a compressor ###for supplying gas at a pressure marginally above the pressure exerted from water 120 on the air plastron 116 to ensure continued facilitation of air disbursement and a system of pipes 148 that connect a gas supply source to the compressor 144. This may be appreciated from FIGS. 8-13.

In some embodiments, the method further comprises the step of providing a continuous gaseous supply to the at least one gaseous injection point 152 in the middle porous layer 134 from the air distribution and replenishment system 234.

In some embodiments, the method further comprises the step of using carbonous gasses to accelerate a conversion of the laser ablated superaerophilic inducing surface 124, to a laser ablated superaerophilic inducing surface 124 having enhanced aerophilic and hydrophobic properties.

In some embodiments, the method further comprises the step of configuring the air distribution and replenishment system 234 to receive a gaseous supply of carbon from at least one of an external atmosphere 246, engine exhaust 156, black water tank fumes 158a, bioreactor exhaust 158b, and galley hood fumes 158c, whereby the gaseous supply is rerouted from the at least one of external atmosphere 246, engine exhaust 156, black water tank fumes 158a, bioreactor exhaust 158b, and galley hood fumes 158c through a turbocharger 248 to a compressor input 174 in the compressor 144/176, whereby the compressor 144/176 supplies the air distribution and replenishment system 234.

In some embodiments, the method further comprises the step of providing a carbon filter 150 with at least an outer casing 208, a lid 202, an intake pipe 200, and an interchangeable carbon-sensitive membrane 204 configured to allow carbon molecules to pass through the interchangeable carbon-sensitive membrane 204, whereby remaining gas molecules that are not able to pass through the interchangeable carbon-sensitive membrane 204 collect and filter out through a top 238 and around the sides 240 to a bottom 242 where the molecules can exit through a carbon-reduced outlet 212.

In some embodiments, the method includes configuring said metallic surface 115 for antifouling characteristics by selecting copper as a material of said metallic surface 115, thereby reducing fouling buildup and keeping said apertures 128 clear for a gaseous replenishment and distribution.

By employing the disclosed system and method, the fuel efficiency of a marine craft or other vehicles affected by hydrodynamic drag may be increased, while at the same time employing methods and components that minimize energy use to run the system, thereby resulting in a net increase in fuel efficiency and a decrease in greenhouse gas emissions.

While there has been shown and described above the preferred embodiment of the instant invention it is to be appreciated that the invention may be embodied otherwise than is herein specifically shown and described and that certain changes may be made in the form and arrangement of the parts without departing from the underlying ideas or principles of this invention as set forth in the Claims appended herewith.

I claim:

1. A system for reducing frictional drag on a hull of a marine craft, comprising:
 a multi-layer air lubrication system; and
 said multi-layer air lubrication system having at least three layers, wherein the at least three layers includes an outermost layer having a constructed superaerophilic inducing surface, a porous layer facilitating an exchange of a gaseous supply to said outermost layer, and a contact layer for bonding said multi-layer air lubrication system to a hull of a marine craft; and
 said constructed superaerophilic inducing surface further comprises:
 a metallic surface;
 said metallic surface having a plurality of superaerophilic inducing microscopic and nanoscopic structures etched within said metallic surface from laser ablation;
 each superaerophilic inducing microscopic structure of said plurality of superaerophilic inducing microscopic and nanoscopic structures defines a trench and a ridge geometry, wherein each ridge structure defines a protruding structure;
 each superaerophilic inducing nanoscopic structure of said plurality of superaerophilic inducing microscopic and nanoscopic structures defines a trench and a ridge geometry covering all surface area of said protruding structures of each of said superaerophilic inducing microscopic structure, wherein surfaces of adjacent ridges of the microscopic structures, extending between an intermediate trench to a respective ridge top, progressively diverge away to define a V-shaped geometry; and
 said metallic surface having a plurality of apertures in at least an innermost point in said trench and ridge geometry of said superaerophilic inducing microscopic structure, wherein each aperture in said plurality of apertures is configured to pass supplied air from an interior side of said metallic structure to a wet side of said metallic structure, thereby creating an air plastron when engaged.

2. The system for reducing frictional drag on a hull of a marine craft, as recited in claim 1, wherein said metallic surface comprises copper and used for antifouling capabilities to thereby suppressing fouling buildup.

3. The system for reducing frictional drag on a hull of a marine craft, as in claim 1, further comprising:
at least one gaseous injection point in said porous layer for receiving a gaseous supply;
an air distribution and replenishment system providing said gaseous supply to said porous layer; and
said air distribution and replenishment system comprising a compressor for supplying gas at a pressure marginally above the pressure exerted from water on the air plastron to ensure continued facilitation of air disbursement.

4. The system for reducing frictional drag on a hull of a marine craft, as recited in claim 3, wherein said gaseous supply consists of filtered carbonous gases, including at least carbon dioxide, carbon monoxide, and methane, to enhance aerophilic and hydrophobic properties of the superaerophilic surface.

5. The system for reducing frictional drag on a hull of a marine craft, as recited in claim 4, wherein said gaseous supply is obtained from at least one of external atmosphere, engine exhaust, black water tank fumes, bioreactor exhaust, and galley hood fumes, whereby said gaseous supply is routed through a turbocharger to a compressor input in said compressor, whereby the compressor supplies the air distribution and replenishment system.

6. The system for reducing frictional drag on a hull of a marine craft, as recited in claim 5, further comprising a carbon filter.

7. The system for reducing frictional drag on a hull of a marine craft, as recited in claim 6, wherein said carbon filter has at least an outer casing, a lid, an intake pipe, and an interchangeable carbon-sensitive membrane configured to allow carbon molecules to pass through said interchangeable carbon-sensitive membrane, whereby remaining gas molecules that are not able to pass through said interchangeable carbon-sensitive membrane collect and filter out through a top and around the sides to a bottom where the molecules can exit through a carbon-reduced outlet.

8. The system for reducing frictional drag on a hull of a marine craft, as recited in claim 3, wherein said at least one gaseous injection point in said porous layer for receiving a gaseous supply further includes several smaller injection tubes to provide even disbursement throughout said porous layer.

9. The system for reducing frictional drag on a hull of a marine craft, as recited in claim 3, further comprising:
a valve within the air distribution and replenishment system to prevent loss of pressure if the air replenishment system fails.

10. The system for reducing frictional drag on a hull of a marine craft, as recited in claim 1, wherein said contact layer is a solid material affixed to the hull of a marine craft with glue or adhesive backing.

11. The system for reducing frictional drag on a hull of a marine craft, as recited in claim 1, wherein said contact layer includes a pressure sensitive adhesive applied.

12. A superaerophilic inducing surface for use in reducing hydrodynamic drag on a hull of a marine craft, comprising:
a metallic surface;
said metallic surface having a plurality of superaerophilic inducing microscopic and nanoscopic structures etched within said metallic surface from laser ablation;
each superaerophilic inducing microscopic structure of said plurality of superaerophilic inducing microscopic and nanoscopic structures defines a trench and a ridge geometry, wherein each ridge structure defines a protruding structure;
each superaerophilic inducing nanoscopic structure of said plurality of superaerophilic inducing microscopic and nanoscopic structures defines a trench and a ridge geometry in a sidewall of each of said superaerophilic inducing microscopic structure covering all surface area of said protruding structure, wherein surfaces of adjacent ridges of the microscopic structures, extending between an intermediate trench to a respective ridge top, progressively diverge away to define a V-shaped geometry; and
said metallic surface having a plurality of apertures in at least an innermost point in said trench and ridge geometry of said superaerophilic inducing microscopic structure, wherein each aperture in said plurality of apertures is configured to pass supplied air from an interior side of said metallic structure to a wet side of said metallic structure, thereby creating an air plastron when engaged.

13. The superaerophilic inducing surface for use in reducing hydrodynamic drag on a hull of a marine craft, as recited in claim 12, further comprising a porous layer configured to withstand the pressure exerted by the air plastron and water surrounding it, while maintaining its shape to allow a free flow of gasses to said plurality of apertures.

14. The superaerophilic inducing surface for use in reducing hydrodynamic drag on a hull of a marine craft, as recited in claim 12, wherein said metallic surface comprises copper and used for antifouling capabilities to thereby suppressing fouling buildup.

15. A method of reducing frictional drag on a marine craft hull, thereby increasing its efficiency, comprising the steps of:
configuring a marine craft hull for reduced frictional drag by providing a superaerophilic inducing surface, wherein said superaerophilic inducing surface comprises a metallic surface having a plurality of superaerophilic inducing microscopic and nanoscopic structures etched within said metallic surface from laser ablation, wherein each superaerophilic inducing microscopic structure of said plurality of superaerophilic inducing microscopic and nanoscopic structures defines a trench and a ridge geometry, wherein each ridge structure defines a protruding structure, wherein surfaces of adjacent ridges of the microscopic structures, extending between an intermediate trench to a respective ridge top, progressively diverge away to define a V-shaped geometry, and each superaerophilic inducing nanoscopic structure of said plurality of superaerophilic inducing microscopic and nanoscopic structures defines a trench and a ridge geometry in a sidewall of each of said superaerophilic inducing microscopic structure, wherein said nanoscopic structures cover all surface area of the protruding structure, and said metallic surface includes a plurality of apertures in at least an innermost point in said trench and ridge geometry of said superaerophilic inducing microscopic structure, wherein each aperture in said plurality of apertures is configured to pass supplied air from an interior side of said metallic structure to a wet side of said metallic structure, thereby creating an air plastron when engaged.

16. The method of reducing frictional drag on a marine craft hull, thereby increasing its efficiency, as recited in claim 15, wherein the superaerophilic inducing surface in the step of configuring a marine craft hull for reduced frictional drag by providing a superaerophilic inducing surface, is applied by:
bonding at least three layers together, wherein said at least three layers comprise said outermost superaerophilic inducing surface layer, a middle porous layer, and an inner contact layer, thereby forming a functional surface assembly;
using laser ablation on the outermost superaerophilic inducing surface layer to create the superaerophilic surface, whereby superaerophilic properties are obtained by creating said microscopic and nanoscopic surface structures comprising grooves etched into said surface, wherein said nanoscopic surface structures are constructed on all sidewall surfaces of said microscopic surfaces;
creating laser-induced period surface structures thereby adding a second layer of structure on the nanoscopic scale;
creating said plurality of apertures by perforating microscopic holes through the outermost superaerophilic inducing surface layer at regular intervals within a trough created by said trench and ridge geometry of the microscopic-scaled grooves using said laser; and
configuring at least one gaseous injection point in said middle porous layer for receiving a gaseous supply.

17. The method of reducing frictional drag on a marine craft hull, thereby increasing its efficiency, as recited in claim 16, further comprising the step of:
applying the superaerophilic surface to said marine craft hull by engaging an adhesive affixed to said contact layer against said marine craft hull.

18. The method of reducing frictional drag on a marine craft hull, thereby increasing its efficiency, as recited in claim 15, further comprising the step of:
providing an air distribution and replenishment system comprising a compressor for supplying gas at a pressure marginally above the pressure exerted from water on the air plastron to ensure continued facilitation of air disbursement and a system of pipes that connect a gas supply source to said compressor.

19. The method of reducing frictional drag on a marine craft hull, thereby increasing its efficiency, as recited in claim 18, further comprising the step of:
providing a continuous gaseous supply to said at least one gaseous injection point in said middle porous layer from said air distribution and replenishment system.

20. The method of reducing frictional drag on a marine craft hull, thereby increasing its efficiency, as recited in claim 19, further comprising the step of:
using carbonous gasses to accelerate a conversion of the laser ablated superaerophilic inducing surface, to a laser ablated superaerophilic inducing surface having enhanced aerophilic and hydrophobic properties.

21. The method of reducing frictional drag on a marine craft hull, thereby increasing its efficiency, as recited in claim 20, further comprising the step of:
configuring said air distribution and replenishment system to receive a gaseous supply of carbon from at least one of an external atmosphere, engine exhaust, black water tank fumes, bioreactor exhaust, and galley hood fumes, whereby said gaseous supply is rerouted from said at least one of external atmosphere, engine exhaust, black water tank fumes, bioreactor exhaust, and galley hood fumes through a turbocharger to a compressor input in said compressor, whereby the compressor supplies the air distribution and replenishment system.

22. The method of reducing frictional drag on a marine craft hull, thereby increasing its efficiency, as recited in claim 21, further comprising the step of
providing a carbon filter with at least an outer casing, a lid, an intake pipe, and an interchangeable carbon-sensitive membrane configured to allow carbon molecules to pass through said interchangeable carbon-sensitive membrane, whereby remaining gas molecules that are not able to pass through said interchangeable carbon-sensitive membrane collect and filter out through a top and around the sides to a bottom where the molecules can exit through a carbon-reduced outlet.

23. The method of reducing frictional drag on a marine craft hull, thereby increasing its efficiency, as recited in claim 15, further comprising:
configuring said metallic surface for antifouling characteristics by selecting copper as a material of said metallic surface, thereby reducing fouling buildup and keeping said apertures clear for a gaseous replenishment and distribution.

24. A system for reducing frictional drag on a hull of a marine craft, comprising:
a multi-layer air lubrication system; and
said multi-layer air lubrication system having at least three layers, wherein the at least three layers includes an outermost layer having a constructed superaerophilic inducing surface, a porous layer facilitating an exchange of a gaseous supply to said outermost layer, and a contact layer for bonding said multi-layer air lubrication system to a hull of a marine craft;
at least one gaseous injection point in said porous layer for receiving a gaseous supply;
an air distribution and replenishment system providing said gaseous supply to said porous layer;
said air distribution and replenishment system comprising a compressor for supplying gas at a pressure marginally above the pressure exerted from water on the air plastron to ensure continued facilitation of air disbursement;
wherein said gaseous supply consists of filtered carbonous gases, including at least carbon dioxide, carbon monoxide, and methane, to enhance aerophilic and hydrophobic properties of the superaerophilic surface; and
wherein said gaseous supply is obtained from at least one of external atmosphere, engine exhaust, black water tank fumes, bioreactor exhaust, and galley hood fumes, whereby said gaseous supply is routed through a turbocharger to a compressor input in said compressor, whereby the compressor supplies the air distribution and replenishment system.

25. The system for reducing frictional drag on a hull of a marine craft, recited in claim 24, further comprising a carbon filter.

26. The system for reducing frictional drag on a hull of a marine craft, recited in claim 25, wherein said carbon filter has at least an outer casing, a lid, an intake pipe, and an interchangeable carbon-sensitive membrane configured to allow carbon molecules to pass through said interchangeable carbon-sensitive membrane, whereby remaining gas molecules that are not able to pass through said interchangeable carbon-sensitive membrane collect and filter out through a top and around the sides to a bottom where the molecules can exit through a carbon-reduced outlet.

27. A method of reducing frictional drag on a marine craft hull, thereby increasing its efficiency, comprising the steps of:
configuring a marine craft hull for reduced frictional drag by providing a superaerophilic inducing surface, wherein said superaerophilic inducing surface comprises a metallic surface having a plurality of superaerophilic inducing microscopic and nanoscopic structures etched within said metallic surface from laser ablation, wherein each superaerophilic inducing microscopic structure of said plurality of superaerophilic inducing microscopic and nanoscopic structures defines a trench and a ridge geometry, wherein each ridge structure defines a protruding structure and each superaerophilic inducing nanoscopic structure of said plurality of superaerophilic inducing microscopic and nanoscopic structures defines a trench and a ridge geometry in a sidewall of each of said superaerophilic inducing microscopic structure, wherein said nanoscopic structures cover all surface area of the protruding structure, and said metallic surface includes a plurality of apertures in at least an innermost point in said trench and ridge geometry of said superaerophilic inducing microscopic structure, wherein each aperture in said plurality of apertures is configured to pass supplied air from an interior side of said metallic structure to a wet side of said metallic structure, thereby creating an air plastron when engaged;
providing an air distribution and replenishment system comprising a compressor for supplying gas at a pressure marginally above the pressure exerted from water on the air plastron to ensure continued facilitation of air disbursement and a system of pipes that connect a gas supply source to said compressor;
providing a continuous gaseous supply to said at least one gaseous injection point in said middle porous layer from said air distribution and replenishment system;
using carbonous gasses to accelerate a conversion of the laser ablated superaerophilic inducing surface, to a laser ablated superaerophilic inducing surface having enhanced aerophilic and hydrophobic properties;
configuring said air distribution and replenishment system to receive a gaseous supply of carbon from at least one of an external atmosphere, engine exhaust, black water tank fumes, bioreactor exhaust, and galley hood fumes, whereby said gaseous supply is rerouted from said at least one of external atmosphere, engine exhaust, black water tank fumes, bioreactor exhaust, and galley hood fumes through a turbocharger to a compressor input in said compressor, whereby the compressor supplies the air distribution and replenishment system; and
providing a carbon filter with at least an outer casing, a lid, an intake pipe, and an interchangeable carbon-sensitive membrane configured to allow carbon molecules to pass through said interchangeable carbon-sensitive membrane, whereby remaining gas molecules that are not able to pass through said interchangeable carbon-sensitive membrane collect and filter out through a top and around the sides to a bottom where the molecules can exit through a carbon-reduced outlet.

* * * * *